(12) United States Patent
Loehr et al.

(10) Patent No.: US 12,225,576 B2
(45) Date of Patent: *Feb. 11, 2025

(54) UPLINK RESOURCE ALLOCATION AMONG DIFFERENT OFDM NUMEROLOGY SCHEMES

(71) Applicant: Panasonic Intellectual Property Corporation of America, Torrance, CA (US)

(72) Inventors: Joachim Loehr, Hessen (DE); Prateek Basu Mallick, Hessen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,628

(22) Filed: Feb. 22, 2024

(65) Prior Publication Data

US 2024/0196429 A1    Jun. 13, 2024

Related U.S. Application Data

(63) Continuation of application No. 18/062,542, filed on Dec. 6, 2022, now Pat. No. 11,943,806, which is a
(Continued)

(30) Foreign Application Priority Data

Sep. 30, 2016  (EP) ..................................... 16191772

(51) Int. Cl.
*H04W 72/566*  (2023.01)
*H04W 72/1268*  (2023.01)
(Continued)

(52) U.S. Cl.
CPC ..... *H04W 72/569* (2023.01); *H04W 72/1268* (2013.01); *H04W 72/23* (2023.01); *H04W 88/02* (2013.01); *H04W 88/08* (2013.01)

(58) Field of Classification Search
CPC ......... H04W 72/1242; H04W 72/1268; H04W 72/12–14; H04W 88/02; H04W 88/08
See application file for complete search history.

(56) References Cited

U.S. PATENT DOCUMENTS 10,904,902 B2 *  1/2021  Loehr ................... H04W 72/23
11,553,508 B2 *  1/2023  Loehr ................... H04W 72/23
(Continued)

FOREIGN PATENT DOCUMENTS

EP      2922360 A1    9/2015
EP      3051736 A1    8/2016
(Continued)

OTHER PUBLICATIONS

3GPP, "3rd Generation Partnership Project; Technical Specification Group Radio Access Network; Evolved Universal Terrestrial Radio Access (E-UTRA), Medium Access Control (MAC) protocol specification (Release 8)," 3GPP TS 36.321 V8.3.0, Sep. 2008. (36 pages).
(Continued)

*Primary Examiner* — Rina C Pancholi
(74) *Attorney, Agent, or Firm* — Seed IP Law Group LLP

(57) ABSTRACT

The present disclosure relates to a resource allocation procedure, performed between a user equipment and radio base station. The UE is configured with at least one numerology scheme, each associated with parameters partitioning time-frequency radio resources into resource scheduling units differently. The UE is configured with logical channels each of which is associated with at least one numerology scheme. A receiver of the UE receives from the radio base station an
(Continued)

uplink scheduling assignment, which indicates uplink radio resources usable by the UE. A processor of the UE determines for which numerology scheme the received uplink scheduling assignment is intended based on the received uplink scheduling assignment. The processor performs a logical channel prioritization procedure by allocating the assigned uplink radio resources to the configured logical channels and by prioritizing those logical channels that are associated with the numerology scheme for which the uplink scheduling assignment is intended.

10 Claims, 19 Drawing Sheets

Related U.S. Application Data continuation of application No. 17/123,596, filed on Dec. 16, 2020, now Pat. No. 11,553,508, which is a continuation of application No. 16/266,329, filed on Feb. 4, 2019, now Pat. No. 10,904,902, which is a continuation of application No. PCT/JP2017/026957, filed on Jul. 26, 2017.

(51) Int. Cl.
  *H04W 72/23* (2023.01)
  *H04W 88/02* (2009.01)
  *H04W 88/08* (2009.01)

(56) References Cited

U.S. PATENT DOCUMENTS

| | | | |
|---|---|---|---|
| 11,943,806 B2* | 3/2024 | Loehr | H04W 72/1268 |
| 2014/0161108 A1* | 6/2014 | Lohr | H04L 5/0007 370/336 |
| 2018/0007673 A1* | 1/2018 | Fwu | H04W 4/70 |
| 2018/0199341 A1 | 7/2018 | Baldemair et al. | |
| 2018/0249513 A1 | 8/2018 | Chang et al. | |
| 2018/0270839 A1* | 9/2018 | Loehr | H04W 72/0446 |
| 2019/0149309 A1* | 5/2019 | Kuang | B60T 13/74 |
| 2019/0150176 A1 | 5/2019 | Pelletier et al. | |

FOREIGN PATENT DOCUMENTS

| | | |
|---|---|---|
| WO | WO 2016130175 A1 | 8/2016 |
| WO | WO 2018031135 A1 | 2/2018 |
| WO | WO 2018031638 A1 | 2/2018 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321 V10.2.0, Jun. 2011. (54 pages).

3GPP, "3rd Generation Partnership Project; Technical Specification Group Radio Access Network; Study on Scenarios and Requirements for Next Generation Access Technologies; (Release 14)," 3GPP TR 38.913 V0.3.0, Mar. 2016. (30 pages).

Alcatel-Lucent, Ericsson, LG Electronics Inc, Nokia Corporation, Nokia Siemens Networks, "Correction to MAC Padding BSR," R2-084790, 3GPP TSG-RAN2 Meeting #63, Jeju, Korea, Aug. 18-22, 2008. (6 pages).

Ericsson, "Logical Channel Multiplexing in MAC for NR," R2-165335, Agenda Item: 9.4.2.3, 3GPP TSG-RAN WG2 #95, Gothenburg, Sweden, Aug. 22-26, 2016. (2 pages).

Ericsson, Alcatel-Lucent, ZTE, "Further discussion on S1 signalling optimization," RP-151384, Agenda Item: 14.1.1, 3GPP TSG-RAN #69, Phoenix, Arizona, Sep. 14-16, 2015. (6 pages).

ETSI TS 136 211 V13.1.0, "LTE; Evolved Universal Terrestrial Radio Access (E-UTRA); Physical channels and modulation (3GPP TS 36.211 version 13.1.0 Release 13)", Mar. 2016. (157 pages).

ETSI TS 136 213 V13.0.0, "LTE; Evolved Universal Terrestrial Radio Access (E-UTRA); Physical layer procedures (3GPP TS 36.213 version 13.0.0 Release 13)", May 2016. (328 pages).

ETSI TS 136 321, V13.0.0, "LTE; Evolved Universal Terrestrial Radio Access (E-UTRA); Medium Access Control (MAC) protocol specification (3GPP TS 36.321 version 13.0.0 Release 13)," Feb. 2016. (84 pages).

Intel Corporation, "MAC entities to support multiple NR verticals," R2-165018, Agenda item: 9.4.2.1, 3GPP TSG-RAN2 Meeting #95, Gothenburg, Sweden, Aug. 22-26, 2016. (5 pages).

International Search Report of PCT application No. PCT/JP2017/026957 dated Oct. 17, 2017. (2 pages).

LG Electronics Inc., "Support of flexible TTI in NR," R2-165651, Agenda Item: 9.6, 3GPP TSG-RAN WG2 Meeting #95, Gothenburg, Sweden, Aug. 22-26, 2016. (2 pages).

Samsung, "MAC Aspects for Supporting Multiple Services," R2-165175, Agenda item: 9.4.2.3, 3GPP TSG-RAN WG2 Meeting #95, Göteborg, Sweden, Aug. 22-26, 2016. (4 pages).

Stefania Sesia et al., LTE—The UMTS Long Term Evolution: from Theory to Practice, John Wiley & Sons, Ltd. 2009, chapter 20.2, Jan. 2009. (5 pages).

* cited by examiner

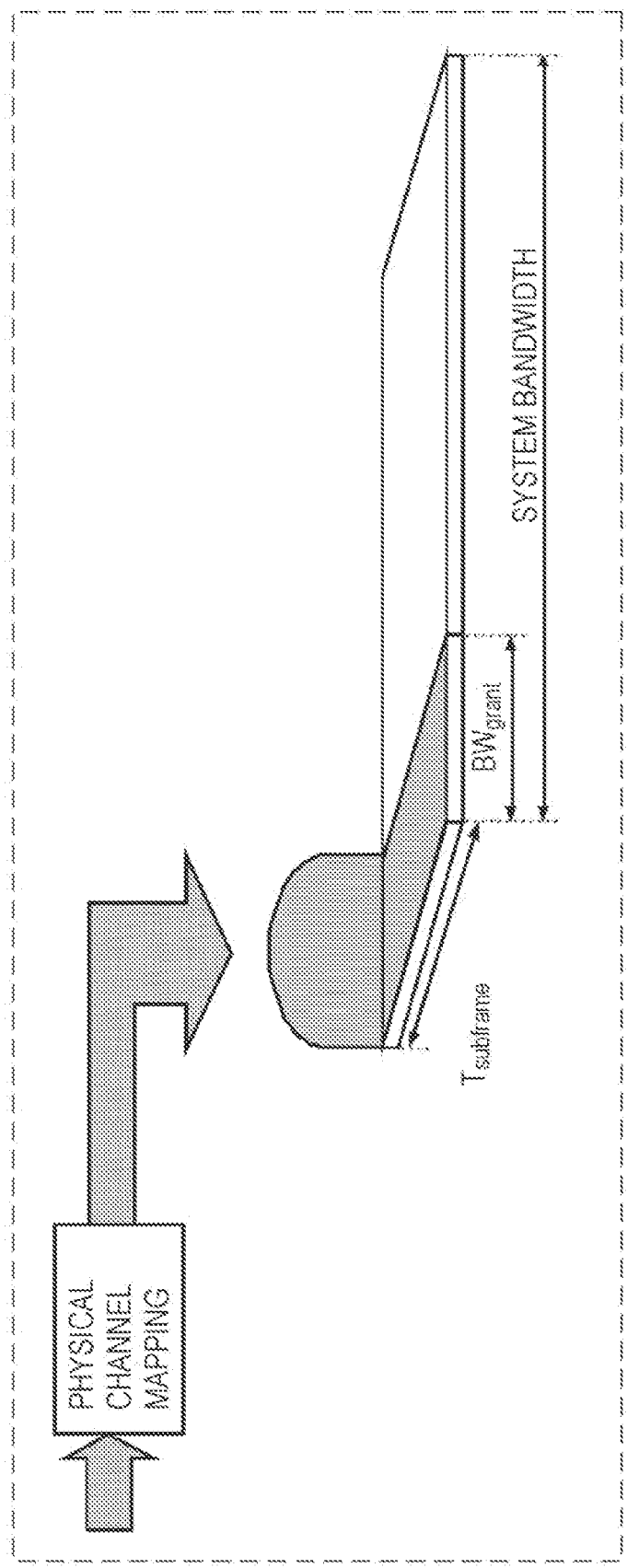

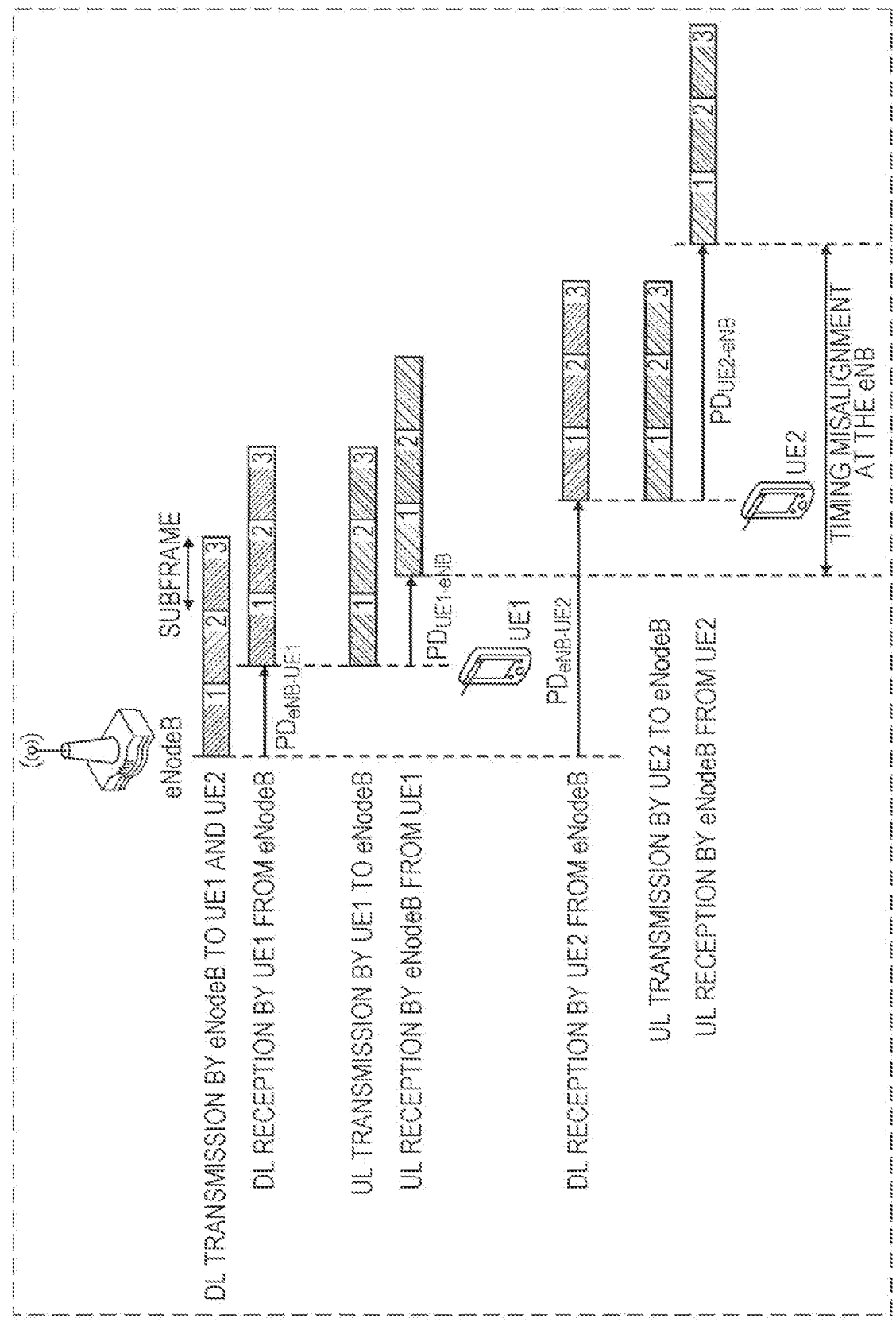

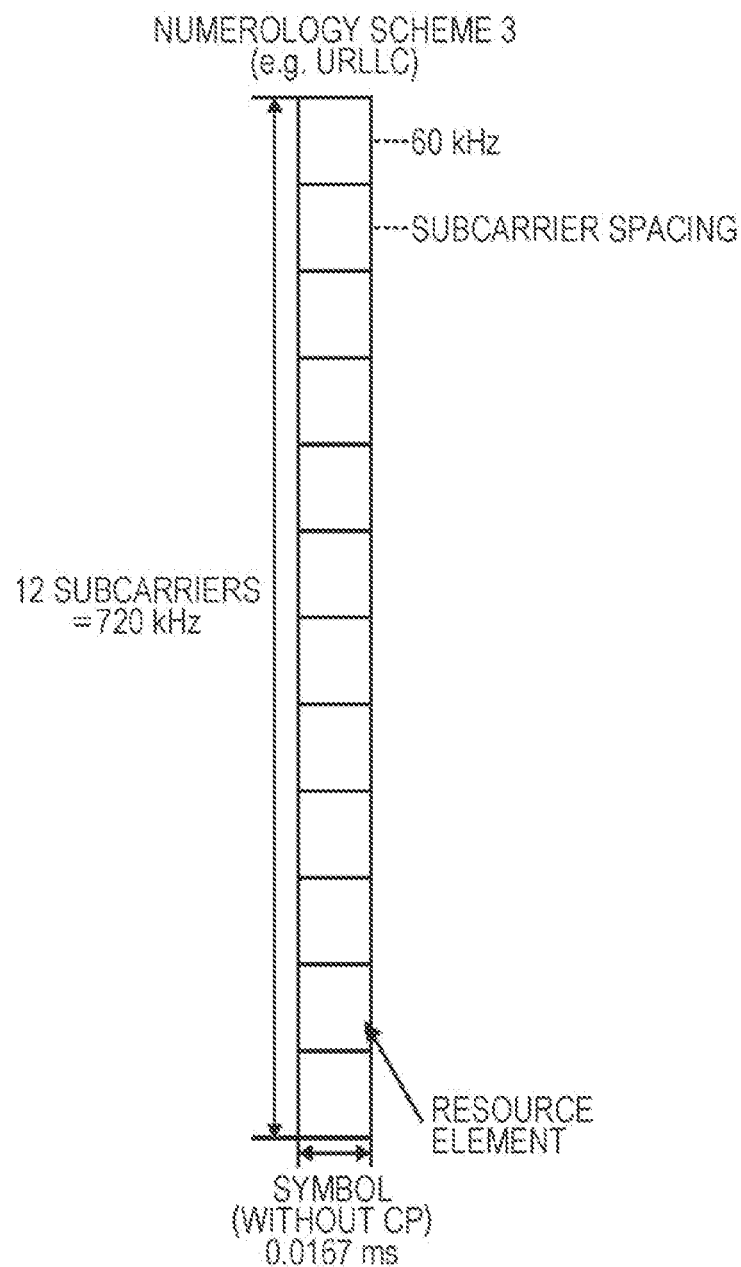

FIG. 16

| | | |
|---|---|---|
| Buffer Size LCG0 | LCG1 Buffer Size LCG2 | Oct 1 |
| | | Oct 2 |
| LCG2 Buffer Size LCG3 | | Oct 3 |
| Buffer Size LCG0 | LCG1 Buffer Size LCG2 | Oct 4 |
| | | Oct 5 |
| LCG2 Buffer Size LCG3 | | Oct 6 |
| Buffer Size LCG0 | LCG1 Buffer Size LCG2 | Oct 7 |
| | | Oct 8 |
| LCG2 Buffer Size LCG3 | | Oct 9 |

BUFFER STATUS FOR USAGE SCENARIO 1 (eMBB) — Oct 1, Oct 2, Oct 3
BUFFER STATUS FOR USAGE SCENARIO 2 (mMTC) — Oct 4, Oct 5, Oct 6
BUFFER STATUS FOR USAGE SCENARIO 3 (URLLC) — Oct 7, Oct 8, Oct 9

UPLINK RESOURCE ALLOCATION AMONG DIFFERENT OFDM NUMEROLOGY SCHEMES

BACKGROUND

1. Technical Field

The present disclosure relates to an improved radio resource allocation procedure in a mobile communication system involving several different OFDM numerology schemes. The present disclosure is providing the corresponding methods, radio base station and user terminals.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel-8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel-8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g. parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} \times N^{RB}_{SC}$ subcarriers and $N^{DL}_{symb}$ OFDM symbols. $N^{DL}_{RB}$ is the number of resource blocks within the bandwidth. The quantity $N^{DL}RB$ depends on the downlink transmission bandwidth configured in the cell and shall fulfill $N_{RB}^{min,DL} \leq N_{RB}^{DL} \leq N_{Rb}^{max,DL}$, where $N^{min,DL}_{RB}=6$ and $N^{max,DL}_{RB}=110$ are respectively the smallest and the largest downlink bandwidths, supported by the current version of the specification. $N^{RB}_{SC}$ is the number of subcarriers within one resource block. For normal cyclic prefix subframe structure, $N^{RB}_{SC}=12$ and $N^{DL}_{symb}=7$.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g. 7 OFDM symbols) and consecutive subcarriers in the frequency domain as exemplified in FIG. 2 (e.g. 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.1.0, section 6.2, available at http://www.3gpp.org).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel-8/9 compatible, at least when the bandwidth of a component carrier do not exceed the supported bandwidth of a LTE Rel-8/9 cell. Not all component carriers aggregated by a user equipment may necessarily be Rel-8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel-10 user equipment with reception and/or transmission capabilities for carrier aggregation can simultaneously receive and/or transmit on multiple serving cells, whereas an LTE Rel-8/9 user equipment can receive and transmit on a single serving cell only, provided that the structure of the component carrier follows the Rel-8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel-8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

The characteristics of the downlink and uplink PCell are:
For each SCell the usage of uplink resources by the UE in addition to the downlink ones is configurable (the number of DL SCCs configured is therefore always larger or equal to the number of UL SCCs, and no SCell can be configured for usage of uplink resources only)
The downlink PCell cannot be de-activated, unlike SCells
Re-establishment is triggered when the downlink PCell experiences Rayleigh fading (RLF), not when downlink SCells experience RLF
Non-access stratum information is taken from the downlink PCell
PCell can only be changed with handover procedure (i.e. with security key change and RACH procedure)
PCell is used for transmission of PUCCH
The uplink PCell is used for transmission of Layer 1 uplink control information
From a UE viewpoint, each uplink resource only belongs to one serving cell The configuration and reconfiguration, as well addition and removal, as of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking, established by RRC signaling, between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g. the 3GPP technical standard TS 36.321, current version 13.0.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321) for the RLC layer through logical channels, which are either control logical channels which carry control data (e.g. RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e. the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e. the modulation and coding scheme, MCS), the number of physical resource blocks etc. More information on the functioning of the physical layer can be found in the 3GPP technical standard 36.213 current version 13.0.0.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e. RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e. RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer.

Uplink Access Scheme for LTE/LTE-A

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-toaverage power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size BWgrant during one time interval, e.g. a subframe, onto which coded information bits are mapped. It should be noted that a sub-frame, also referred to as transmission time interval (TTI), is the smallest time interval for user data transmission. It is however possible to assign a frequency resource BWgrant over a longer time period than one TTI to a user by concatenation of subframes.

The frequency resource can either be in a localized or distributed spectrum as illustrated in FIG. 3A and FIG. 3B.

As can be seen from FIG. 3A, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as can be seen from FIG. 3B, distributed single-carrier is characterized by the transmitted signal having a non-continuous ("comb-shaped") spectrum that is distributed over the system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

At first glance, the spectrum in FIG. 3B may give the impression of a multi-carrier signal where each comb-finger corresponds to a "sub-carrier". However, from the time-domain signal-generation of a distributed single-carrier signal, it should be clear that what is being generated is a true single-carrier signal with a corresponding low peak-to-average power ratio. The key difference between a distributed single-carrier signal vs. a multi-carrier signal, such as e.g. OFDM, is that, in the former case, each "sub-carrier" or "comb finger" does not carry a single modulation symbol. Instead each "comb-finger" carries information about all modulation symbols. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that, in many cases the scheduling decision may decide to give the whole bandwidth to a single UE to achieve high data rates.

UL Scheduling Scheme for LTE

The uplink scheme allows for both scheduled access, i.e. controlled by eNB, and contention-based access.

In case of scheduled access, the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e. when UE is performing initial access to a cell or for requesting uplink resources. For data transmissions, i.e. uplink transmissions using the UL-SCH/PUSCH, only the scheduled access scheme, i.e. eNB controlled resource allocation, is used for LTE/LTE-A.

For the scheduled access, the Node B scheduler assigns a user a unique frequency/time resource for uplink data transmission. More specifically the scheduler determines
 which UE(s) that is (are) allowed to transmit,
 which physical channel resources (frequency), and
 Transport format (Modulation Coding Scheme (MCS)) to be used by the mobile terminal for transmission.

The allocation information is signaled to the UE via a scheduling grant, sent on the L1/L2 control channel. For simplicity reasons this channel may be called uplink grant channel-. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e. there are no "per UE per RB" grants). Therefore, the UE needs to distribute the allocated resources among the radio bearers according to some rules, which will be explained in detail in connection with the logical channel prioritization procedure.

Logical Channel Prioritization (LCP) Procedure

For uplink transmissions there is a desire that starvation be avoided and greater flexibility in resource assignment between bearers be possible, whilst retaining the per-UE, rather than per-UE-bearer, resource allocation.

The UE has an uplink rate control function which manages the sharing of uplink resources between radio bearers. This uplink rate control function is also referred to as logical channel prioritization procedure in the following. The Logical Channel Prioritization (LCP) procedure is applied when a new transmission is performed, i.e. a Transport block needs to be generated. One proposal for assigning capacity has been to assign resources to each bearer, in priority order, until each has received an allocation equivalent to the minimum data rate for that bearer, after which any additional capacity is assigned to bearers in, for example, priority order.

As will become evident from the description of the LCP procedure given below, the implementation of the LCP procedure residing in the UE is based on the token bucket model, which is well known in the IP world. The basic functionality of this model is as follows. Periodically at a given rate a token, which represents the right to transmit a quantity of data, is added to the bucket. When the UE is granted resources, it is allowed to transmit data up to the amount represented by the number of tokens in the bucket. When transmitting data, the UE removes the number of tokens equivalent to the quantity of transmitted data. In case the bucket is full, any further tokens are discarded. For the addition of tokens it could be assumed that the period of the repetition of this process would be every TTI, but it could be easily lengthened such that a token is only added every second. Basically, instead of every 1 ms a token is added to the bucket, 1000 tokens could be added every second. In the following the logical channel prioritization procedure which is used in Rel-8 is described. The Logical Channel Prioritization is standardized e.g. in 3GPP TS 36.321, the current version in subclause 5.4.3.1.

RRC controls the scheduling of uplink data by signaling for each logical channel:
  priority where an increasing priority value indicates a lower priority level,
  prioritisedBitRate which sets the Prioritized Bit Rate (PBR),
  bucketSizeDuration which sets the Bucket Size Duration (BSD).

The idea behind prioritized bit rate is to support for each bearer, including low priority non-GBR (Guaranteed Bit Rate) bearers, a minimum bit rate in order to avoid a potential starvation. Each bearer should at least get enough resources in order to achieve the prioritized bit rate (PRB).

The UE shall maintain a variable Bj for each logical channel j. Bj shall be initialized to zero when the related logical channel is established and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:
  The UE shall allocate resources to the logical channels in the following steps:
    Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);
    Step 2: the UE shall decrement Bj by the total size of MAC SDUs served to logical channel j in Step 1
    NOTE: The value of Bj can be negative.
    Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.
  The UE shall also follow the rules below during the scheduling procedures above:
    the UE should not segment an RLC SDU (or partially transmitted SDU or retransmitted RLC PDU) if the whole SDU (or partially transmitted SDU or retransmitted RLC PDU) fits into the remaining resources;
    if the UE segments an RLC SDU from the logical channel, it shall maximize the size of the segment to fill the grant as much as possible;
    UE should maximize the transmission of data.

For the Logical Channel Prioritization procedure, the UE shall take into account the following relative priority in decreasing order:
  MAC control element for C-RNTI or data from UL-CCCH;
  MAC control element for BSR, with exception of BSR included for padding;
  MAC control element for PHR;
  data from any Logical Channel, except data from UL-CCCH; and
  MAC control element for BSR included for padding.

When the UE is requested to transmit multiple MAC PDUs in one TTI, i.e. for the case of carrier aggregation, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when the UE is requested to transmit multiple MAC PDUs in one TTI.

There is no restriction for the mapping between logical channels and component carrier(s). In other words, each logical channel can be transmitted on each component carrier. Hence, when generating a TB for transmission on a given component carrier, all logical channels are considered during the LCP procedure.

Buffer Status Reporting

Buffer status reports (BSR) from the UE to the eNB are used to assist the eNodeB in allocating uplink resources, i.e. uplink scheduling. For the downlink case the eNB scheduler is obviously aware of the amount of data to be delivered to each UE, however for the uplink direction, since scheduling decisions are done at the eNB and the buffer for the data is in the UE, BSRs have to be sent from UE to the eNB in order to indicate the amount of data that needs to be transmitted over UL-SCH.

There are basically two types of BSR defined for LTE: a long BSR and a short BSR. Which one is transmitted by the UE depends on the available transmission resources in a transport block, on how many groups of logical channels have non-empty buffer, and on whether a specific event is triggered at the UE. The long BSR reports the amount of data for four logical channel groups, whereas the short BSR indicates only the amount of data buffered for the highest logical channel group. The reason for introducing the logical channel group concept is that even though the UE may have more than four logical channels configured, reporting the buffer status for each individual logical channel would cause too much signaling overhead. Therefore, eNB assigns each logical channel to a logical channel group; preferably logical channels with the same/similar QoS requirements should be allocated within the same logical channel group.

A BSR is triggered for the following events:
  Whenever data arrives for a logical channel which has a higher priority than the logical channels whose buffer are non-empty
  Whenever data becomes available for any logical channel when there was previously no data available for transmission
  Whenever the retransmission BSR timer expires
  Whenever periodic BSR reporting is due, i.e. periodicBSR timer expires
  Whenever there is a spare space in a transport block which can accommodate a BSR In order to be robust against transmission failures, there is a BSR retransmission mechanism defined for LTE; the retransmission BSR timer is started or restarted whenever an uplink grant is received. If no uplink grant is received before the timer expires, another BSR is triggered by the UE.

If the UE has no uplink resources allocated for including a BSR in the TB when a BSR is triggered, the UE sends a scheduling request (SR) on the Physical Uplink Control Channel (PUCCH) if configured. For the case that there are no D-SR (dedicated Scheduling request) resources on PUCCH configured, the UE will start the Random Access Procedure (RACH procedure) in order to request UL-SCH resources for transmitting the BSR to the eNB. However, it should be noted that the UE will not trigger SR transmission for the case that a periodic BSR is to be transmitted. Furthermore, an enhancement to the SR transmission has been introduced for a specific scheduling mode where resources are persistently allocated with a defined periodicity in order to save L1/2 control signaling overhead for transmission grants, which is referred to as semi-persistent scheduling (SPS). One example for a service, which has been mainly considered for semi-persistent scheduling, is VoIP (Voice over IP). Every 20 ms a VoIP packets is generated at the codec during a talk-spurt. Therefore, the eNB can allocate uplink or respectively downlink resources persistently every 20 ms, which could be then used for the transmission of VoIP packets. In general, SPS is beneficial for services with predictable traffic behavior, i.e. constant bit rate, packet arrival time is periodic. For the case that SPS is configured for the uplink direction, the eNB can turn off SR triggering/transmission for certain configured logical channels, i.e. BSR triggering due to data arrival on those specific configured logical channels will not trigger an SR. The motivation for such kind of enhancements is that reporting an SR for those logical channels which will use the semi-persistently allocated resources (logical channels which carry VoIP packets) is of no value for the eNB scheduling and hence should be avoided.

RRC controls BSR reporting by configuring the two timers periodicBSR-Timer and retxBSR-Timer and by, for each logical channel, optionally signaling logicalChannel-Group which allocates the logical channel to an LCG.

For the Buffer Status reporting procedure, the UE shall consider all radio bearers which are not suspended and may consider radio bearers which are suspended.

A Buffer Status Report (BSR) shall be triggered if any of the following events occur:
- UL data, for a logical channel which belongs to an LCG, becomes available for transmission in the RLC entity or in the PDCP entity (the definition of what data shall be considered as available for transmission is e.g. specified in section 5.4 of document TS36.321-a.4.0), and either the data belongs to a logical channel with higher priority than the priorities of the logical channels which belong to any LCG and for which data is already available for transmission, or there is no data available for transmission for any of the logical channels which belong to an LCG, in which case the BSR is referred below to as a "Regular BSR";
- UL resources are allocated and the number of padding bits is equal to or larger than the size of the Buffer Status Report MAC control element plus its subheader, in which case the BSR is referred below to as a "Padding BSR";
- retxBSR-Timer expires and the UE has data available for transmission for any of the logical channels which belong to a LCG, in which case the BSR is referred below to as a "Regular BSR";
- periodicBSR-Timer expires, in which case the BSR is referred below to as a "Periodic BSR".

For Regular and Periodic BSR:
if more than one LCG has data available for transmission in the TTI where the BSR is transmitted: report Long BSR;
else report Short BSR.
For Padding BSR:
  if the number of padding bits is equal to or larger than the size of the Short BSR plus its subheader but smaller than the size of the Long BSR plus its subheader:
    if more than one LCG has data available for transmission in the TTI where the BSR is transmitted: report Truncated BSR of the LCG with the highest priority logical channel with data available for transmission;
    else report Short BSR.
  else if the number of padding bits is equal to or larger than the size of the Long BSR plus its subheader: report Long BSR.

If the buffer Status reporting procedure determines that at least one BSR has been triggered and not cancelled:
  if the UE has UL resources allocated for new transmission for this TTI:
  instruct the Multiplexing and Assembly procedure to generate the BSR MAC control element(s);
  start or restart periodicBSR-Timer except when all the generated BSRs are Truncated BSRs;
  start or restart retxBSR-Timer.
  else if a Regular BSR has been triggered:
    if an uplink grant is not configured or the Regular BSR was not triggered due to data becoming available for transmission for a logical channel for which logical channel SR masking (logicalChannelSR-Mask) is setup by upper layers:
    a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI, and this value shall be reported in all BSRs reporting the buffer status for this LCG.

NOTE: A Padding BSR is not allowed to cancel a triggered Regular/Periodic BSR. A Padding BSR is triggered for a specific MAC PDU only and the trigger is cancelled when this MAC PDU has been built.DRX—Discontinuous Reception.

In order to provide reasonable battery consumption of the UE, LTE/LTE-A provides a concept of discontinuous reception (DRX). DRX functionality can be configured for an 'RRC_CONNECTED' UE so that it does not always need to monitor the downlink channels. Technical Standard TS 36.321 Chapter 5.7 explains the DRX.

A DRX cycle consists of an 'On Duration' during which the UE monitors the PDCCH. It is a duration in downlink subframes that the UE waits for, after waking up from DRX, to receive PDCCHs. If the UE successfully decodes a PDCCH, the UE stays awake and starts the 'Inactivity-timer', defining the duration in downlink subframes that the UE monitors PDCCH. When UE fails to decode a PDCCH during this period, it re-enters DRX. The UE restarts the inactivity timer following a single successful decoding of a PDCCH for a first transmission only (i.e. this does not apply to retransmissions).

The total duration that the UE is awake is called 'Active-time' and includes the "on-duration" of the DRX cycle, the time UE is performing continuous reception while the inactivity timer has not expired and the time UE is performing continuous reception while waiting for a DL retransmission after one HARQ RTT. Similarly, for the uplink the UE is awake at the subframes where uplink retransmissions grants can be received, i.e. every 8 ms after an initial uplink transmission until a maximum number of retransmissions is reached. Based on the above the minimum active time is of length equal to on-duration, and the maximum is undefined (infinite).

Furthermore, also after having sent an SR on the PUCCH, the UE will be awake monitoring for a PDCCH allocating UL-SCH resources. The 'DRX period' is the duration of downlink subframes during which a UE can skip reception of downlink channels for battery saving purposes.

The parameterization of the DRX cycle involves a trade-off between battery saving and latency. On the one hand, a long DRX period is beneficial for lengthening the UE's battery life. For example, in the case of a web browsing service, it is usually a waste of resources for a UE to continuously receive downlink channels while the user is reading a downloaded web page. On the other hand, a shorter DRX period is better for faster response when data transfer is resumed—for example when a user requests another web page.

To meet these conflicting requirements, two DRX cycles—a short cycle and a long cycle—can be configured for each UE. The transition between the short DRX cycle, the long DRX cycle and continuous reception is controlled either by a timer or by explicit commands from the eNB. In some sense, the short DRX cycle can be considered as a confirmation period in case a late packet arrives, before the UE enters the long DRX cycle—if data arrives at the eNB while the UE is in the short DRX cycle, the data is scheduled for transmission at the next wake-up time and the UE then resumes continuous reception. On the other hand, if no data arrives at the eNB during the short DRX cycle, the UE enters the long DRX cycle, assuming that the packet activity is finished for the time being.

During the Active Time the UE monitors the PDCCH, reports SRS as configured and reports CQI/PMI/RI/PTI on PUCCH. When the UE is not in Active time, type-0-triggered SRS and CQI/PMI/RI/PTI on PUCCH may not be reported. If CQI masking is set up for the UE, the reporting of CQI/PMI/RI/PTI on PUCCH is limited to the On-Duration.

Available DRX values are controlled by the network and start from non-DRX up to x seconds. Value x may be as long as the paging DRX used in IDLE. Measurement requirements and reporting criteria can differ according to the length of the DRX interval, i.e. long DRX intervals may experience more relaxed requirements.

When DRX is configured, periodic CQI reports can only be sent by the UE during the "active-time". RRC can further restrict periodic CQI reports so that they are only sent during the on-duration.

In FIG. 4 a per-subframe example of the DRX cycle is shown. The UE checks for scheduling messages (indicated by its C-RNTI on the PDCCH) during the 'On Duration' period of either the long DRX cycle or the short DRX cycle depending on the currently active cycle. When a scheduling message is received during an 'On Duration', the UE starts an 'Inactivity Timer' and monitors the PDCCH in every subframe while the Inactivity Timer is running. During this period, the UE can be regarded as being in a continuous reception mode. Whenever a scheduling message is received while the Inactivity Timer is running, the UE restarts the Inactivity Timer, and when it expires, the UE moves into a short DRX cycle and starts a 'Short DRX cycle timer'. The short DRX cycle may also be initiated by means of a MAC Control Element. When the short DRX cycle timer expires, the UE moves into a long DRX cycle. In addition to this DRX behavior, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

The above mentioned DRX related timers like DRX-Inactivity timer, HARQ RTT timer, DRX retransmission timer and Short DRX cycle timer are started and stopped by events such as reception of a PDCCH grant or MAC Control element (DRX MAC CE); hence the DRX status (active time or non-active time) of the UE can change from one subframe to another and is hence not always predictable by the mobile station or eNodeB.

There is only one DRX cycle per UE. All aggregated component carriers follow this DRX pattern.

Timing Advance

For the uplink transmission scheme of 3GPP, LTE single-carrier frequency division multiple access (SC-FDMA) was chosen to achieve an orthogonal multiple-access in time and frequency between the different user equipments transmitting in the uplink. Uplink orthogonality is maintained by ensuring that the transmissions from different user equipments in a cell are time-aligned at the receiver of the eNodeB. This avoids intra-cell interference occurring, both between user equipments assigned to transmit in consecutive sub-frames and between user equipments transmitting on adjacent subcarriers. Time alignment of the uplink transmissions is achieved by applying a timing advance at the user equipment's transmitter, relative to the received downlink timing as exemplified in FIG. 5A and FIG. 5B. The main role of this is to counteract differing propagation delays between different user equipments.

FIG. 5A illustrates the misalignment of the uplink transmissions from two mobile terminals in case no uplink timing alignments is performed, such that the eNodeB receives the respective uplink transmissions from the two mobile terminals at different timings.

FIG. 5B in contrast thereto illustrates synchronized uplink transmissions for two mobile terminals. The uplink timing alignment is performed by each mobile terminal and applied to the uplink transmissions such that at the eNodeB the uplink transmissions from the two mobile terminals arrive at substantially the same timing.

Initial Timing Advance Procedure

When user equipment is synchronized to the downlink transmissions received from eNodeB, the initial timing advance is set by means of the random access procedure as described below. The user equipment transmits a random access preamble based on which the eNodeB can estimate the uplink timing. The eNodeB responds with an 11-bit initial timing advance command contained within the Random Access Response (RAR) message. This allows the timing advance to be configured by the eNodeB with a granularity of 0.52 µs from 0 up to a maximum of 0.67 ms.

Additional information on the control of the uplink timing and timing advance on 3GPP LTE (Release 8/9) can be found in chapter 20.2 of Stefania Sesia, Issam Toufik and Matthew Baker, "LTE—The UMTS Long Term Evolution: From Theory to Practice", John Wiley & Sons, Ltd. 2009.

Updates of the Timing Advance

Once the timing advance has been first set for each user equipment, the timing advance is updated from time to time to counteract changes in the arrival time of the uplink signals at the eNodeB. In deriving the timing advance update commands, the eNodeB may measure any uplink signal which is useful. The details of the uplink timing measurements at the eNodeB are not specified, but left to the implementation of the eNodeB.

The timing advance update commands are generated at the Medium Access Control (MAC) layer in the eNodeB and transmitted to the user equipment as MAC control elements which may be multiplexed together with data on the Physical Downlink Shared Channel (PDSCH). Like the initial timing advance command in the response to the Random Access Channel (RACH) preamble, the update commands have a granularity of 0.52 µs. The range of the update commands is from −16 µs to +16 µs, allowing a step change in uplink timing equivalent to the length of the extended cyclic prefix. They would typically not be sent more frequently than about every 2 seconds. In practice, fast updates are unlikely to be necessary, as even for a user equipment moving at 500 km/h the change in round-trip path length is not more than 278 m/s, corresponding to a change in round-trip time of 0.93 µs/s.

The eNodeB balances the overhead of sending regular timing update commands to all the UEs in the cell against a UE's ability to transmit quickly when data arrives in its transmit buffer. The eNodeB therefore configures a timer for each user equipment, which the user equipment restarts each time a timing advance update is received. In case the user equipment does not receive another timing advance update before the timer expires, it must then consider that it has lost uplink synchronization (see also section 5.2 of 3GPP TS 36.321, "Evolved Universal Terrestrial Radio Access (E-UTRA); Medium Access Control (MAC) protocol specification", version 10.2.0, available at http://www.3gpp.org).

In such a case, in order to avoid the risk of generating interference to uplink transmissions from other user equipments, the UE is not permitted to make uplink transmissions of any sort (except the transmission of a random access preamble) and needs to revert to the initial timing alignment procedure in order to restore the uplink timing.

Upon reception of a timing advance command, the user equipment shall adjust its uplink transmission timing for PUCCH/PUSCH/SRS of the primary cell. The timing advance command indicates the change of the uplink timing relative to the current uplink timing as multiples of 16 Ts (a basic unit of time, being 1/sampling frequency).

Timing Advance and Component Carrier Aggregation in the Uplink

In Rel-10 of the 3GPP LTE standards the user equipment only maintains one timing advance value and applies this to uplink transmissions on all aggregated component carriers. For Rel-10, aggregation of cells within the same frequency band is supported, so called intra-frequency carrier aggregation. In particular, uplink timing synchronization is performed for PCell, e.g. by RACH procedure on PCell, and then, the user equipment uses the same uplink timing for uplink transmissions on aggregated SCells. A single timing advance for all aggregated uplink component carriers is regarded as sufficient, since 3GPP LTE-A Rel-10 support only carrier aggregation of carriers from the same frequency band.

From Release-11 onwards, it is possible to handle CA with component carriers requiring different timing advances, for example combining CC from eNodeB with CC from RRH (remote radio head) to support non-collocated cells.

Also, support of different uplink transmission timings on different serving cells address the deployment scenario where the propagation delays are different on different serving cells due to e.g. frequency selective repeaters.

It is not practical to maintain TA for each serving cell; instead, it would make sense to group a set of collocated serving cells, so that, the same TA is maintained across all the serving cells belonging to that group. Also, it is very important to have a timing reference cell for the entire group. In Release-11, a Timing Advance Group (TAG) was introduced. A TAG consists of one or more serving cells with the same uplink TA and same downlink timing reference cell. Each TAG contains at least one serving cell with configured uplink, and the mapping of each serving cell to a TAG is configured by RRC.

The TAG containing PCell is called as pTAG (Primary Timing Advance Group). For the pTAG, the UE uses PCell as timing reference. If a TAG contains only SCells(s), and no PCell, then it is called as sTAG (Secondary Timing Advance Group). In a sTAG, the UE may use any of the activated SCells of this TAG as a timing reference cell, but should not change it unless necessary.

The UE has a configurable timer called timeAlignmentTimer per TAG. This TAG specific timeAlignmentTimer is provided by RRC at the time of sTAG configuration.

Maintenance of Uplink Time Alignment

As explained above, the UE maintains TimeAlignmentTimer per TAG. The TimeAlignmentTimer is used to control how long the UE considers the Serving Cells belonging to the associated TAG to be uplink time aligned. The UE shall start or restart the TAG associated timeAlignmentTimer when a Timing Advance Command is received in a RAR (Radio Access Response) or MAC CE for the corresponding TAG.

The synchronization status of the UE follows the synchronization status of the pTAG. When the timer associated with pTAG is not running, the timer associated with a sTAG shall not be running.

When the timeAlignmentTimer associated with the pTAG is expired, the UE shall:
  flush all HARQ buffers for all serving cells belonging to pTAG as well as sTAG;
  notify RRC to release PUCCH/SRS for all serving cells;
  clear any configured downlink assignments and uplink grants (applicable for PCell only); and
  consider that all the running timeAlignmentTimers (timers for sTAG as well) as expired.

When the TimeAlignmentTimer associated with the sTAG is expired, the UE shall:
  flush all HARQ buffers for all the serving cells belonging to this sTAG; and
  notify RRC to release SRS for all the serving cells belonging to this sTAG.

The UE shall not perform any uplink transmission on a Serving Cell except the RA Preamble transmission when the TimeAlignmentTimer associated with the TAG to which this Serving Cell belongs is not running.

When the timeAlignmentTimer associated with the pTAG is not running, the UE shall not perform any uplink transmission on any Serving Cell except the RA Preamble transmission (only) on the PCell.

New Radio Access Technology—5G

Targeting at providing the first release of technical specifications for the next generation cellular technology (aka 5G) in June 2018 (Release-15), the studies for 5G within 3GPP have already started. At the 3GPP TSG RAN #71 meeting (Gothenburg, March 2016), the first 5G Study Item, "Study on New Radio Access Technology" involving RAN1, RAN2, RAN3 and RAN4 was approved. This is an important 3GPP milestone as this 5G Study Item is expected to become the Release-15 Work Item that defines the first 5G standard.

The aim of the Study Item is to develop a "New Radio (NR)" access technology to meet a broad range of use cases including enhanced mobile broadband (eMBB), massive MTC (mMTC), critical MTC, and additional requirements defined during the RAN requirements study. It is expected that the new Radio Access Technology (RAT) will consider frequency ranges up to 100 GHz (see e.g. 3GPP TR 38.913 "Study on Scenarios and Requirements for Next Generation Access Technologies", current version 0.3.0).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks. A second objective is to achieve forward compatibility.

It is assumed that the normative specification will occur in two phases: Phase I (to be completed in June 2018) and Phase II (to be completed in December 2019). The phase-I specification of the new RAT must be forward compatible (in terms of efficient co-cell/site/carrier operation) with the phase-II specification and beyond, while backward compatibility to LTE is not required. The phase-II specification of the new RAT builds on the foundation of the phase-I specification and shall meet all the requirements set for the new RAT. Smooth future evolution beyond Phase II needs to be ensured to support later advanced features and to enable support of service requirements identified later than Phase II specification.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP based OFDM and DFT-S-OFDM are used as waveform for downlink and uplink transmission, respectively. One of the design targets in NR is to seek the common waveform as much as possible for downlink, uplink and sidelink. It has been identified by some companies that to introduce DFT spreading might not be needed for some cases of uplink transmission. Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives.

Furthermore, the technical features which are necessary to enable the new RAT to meet the above-mentioned objectives shall be studied, including efficient multiplexing of traffic for different services and use cases on the same contiguous block of spectrum.

As identified in TR 38.913, the various use cases/deployment scenarios for NR have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-$10^{-5}$ within 1 ms). Finally, mMTC requires high connection density (1,000,000 devices/km$^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing should be optimized accordingly to retain the similar CP overhead.

In 3GPP RAN1 #84bis meeting (Busan, April 2016), it was agreed that it is necessary for NR to support more than one value of subcarrier-spacing. The values of subcarrier-spacing are derived from a particular value of subcarrier-spacing multiplied by N where N is an integer. In the latest RAN1 meeting, RAN1 #85 (Nanjing, May 2016), it was concluded as a working assumption that the LTE-based numerology including 15 kHz subcarrier spacing is the baseline design for the NR numerology. For the scaling factor N, it was concluded N=$2^n$ as the baseline design assumption for the NR numerology. The down selection of numerology candidates might be done in the future meetings. Correspondingly, subcarrier spacings of 15 kHz, 30 kHz, 60 kHz . . . are being considered. FIG. 6A to FIG. 6C exemplarily illustrate three different subcarrier spacings (15 kHz, 30 kHz, and 60 kHz) and the corresponding symbol duration. The symbol duration $T_u$ and the subcarrier spacing $\Delta f$ are directly related through the formula $\Delta f=1/T_u$. In a similar manner as in the LTE systems, the term "resource element" can be used to denote a minimum resource unit being composed of one subcarrier for the length of one OFDM/SC-FDMA symbol.

Also in the latest RAN1 meeting, it was agreed that the two OFDM-based waveforms, OFDM with CP and DFT-S-OFDM (SC-FDMA) with CP, should be used as the RAN1 NR waveform performance reference. All waveforms proposed in the RAN1 #84bis and #85 meetings can be evaluated based on the agreed evaluation assumptions. Each company should provide details on the DFT-spreading, guard interval, Tx/Rx filtering and/or windowing applied to OFDM waveform for evaluation. Narrowing down the waveform candidates for NR will be done in future meetings.

It has been also recognized that NR should support flexible network and UE channel bandwidth due to several reasons: NR is expected to support operation in a very wide range of spectrum, ranging from sub-GHz up to tens of GHz with very different possibilities regarding the available spectrum and, hence possible transmission bandwidths. Many frequency bands to be used for NR are not yet fully identified, implying that the size of spectrum allocations is not yet known. NR is expected to support a wide range of applications and use cases, with some requiring very wide UE transmission/reception bandwidth and others requiring very low UE complexity which implies much lower UE transmission/reception bandwidth. Therefore, it was agreed in RAN1 #85 that NR physical-layer design should allow for fine granularity in terms of NR carrier bandwidth, and the devices with different bandwidth capabilities can efficiently access the same NR carrier regardless of the NR carrier bandwidth.

SUMMARY

One non-limiting and exemplary embodiment provides an improved resource allocation procedure between a user equipment and the radio base station. The independent claims provide non-limiting and exemplary embodiments. Advantageous embodiments are subject to the dependent claims.

In one general first aspect, the techniques disclosed here feature a user equipment in a mobile communication system. The user equipment is configured with at least one numerology scheme, each of which is associated with parameters that partition a plurality of time-frequency radio resources of the mobile communication system into resource scheduling units in a different manner. The user equipment is configured with a plurality of logical channels each of which is associated with at least one of the configured numerology schemes. A receiver of the user equipment receives an uplink scheduling assignment from a radio base station that controls the user equipment, the uplink scheduling assignment indicating uplink radio resources usable by the user equipment. A processor of the user equipment determines for which numerology scheme the received uplink scheduling assignment is intended based on the received uplink scheduling assignment. The processor performs a logical channel prioritization procedure by allocating the assigned uplink radio resources to the configured logical channels and by prioritizing those of the configured logical channels that are associated with the numerology scheme for which the uplink scheduling assignment is intended.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3A illustrates a localized allocation of the frequency resources;

FIG. 5A illustrates the misalignment of the uplink transmissions from two mobile terminals in case no uplink timing alignment is performed;

FIG. 6C illustrates subcarrier spacing 60 kHz and the resulting symbol duration;

FIG. 16 illustrates a usage-specific buffer status reporting MAC control element, according to another exemplary embodiment.

DETAILED DESCRIPTION

Basis of the Present Disclosure

In order to support the multiplexing of different services with diverse requirements, it has been agreed in 3GPP RAN1 #85 (Nanjing, May 2016) that NR supports the multiplexing of different numerologies within a same NR carrier bandwidth (from the network perspective). On the other hand, from a UE perspective, a UE may support one or more than one usage scenarios (e.g., an eMBB UE or a UE supporting both eMBB and URLLC). Generally speaking, supporting more than one numerology can complicate UE processing.

From the network perspective, it would be beneficial to consider the multiplexing of different numerologies in both a frequency domain (aka FDM) and a time domain (aka TDM) within a NR carrier. One exemplary multiplexing of different numerologies is given in FIG. 7, where numerology 1 could be used for eMBB, numerology 2 for URLLC and numerology 3 for mMTC. The reason why eMBB and URLLC are better to be TDMed is that they both demand a very broad bandwidth, which is necessary for eMBB to achieve high data rates and for URLLC to achieve better frequency diversity to meet the high-reliability requirements. On the other hand, mMTC is considered to be FDMed with eMBB and/or URLLC since it requires only a narrow transmission bandwidth.

Figure 1:
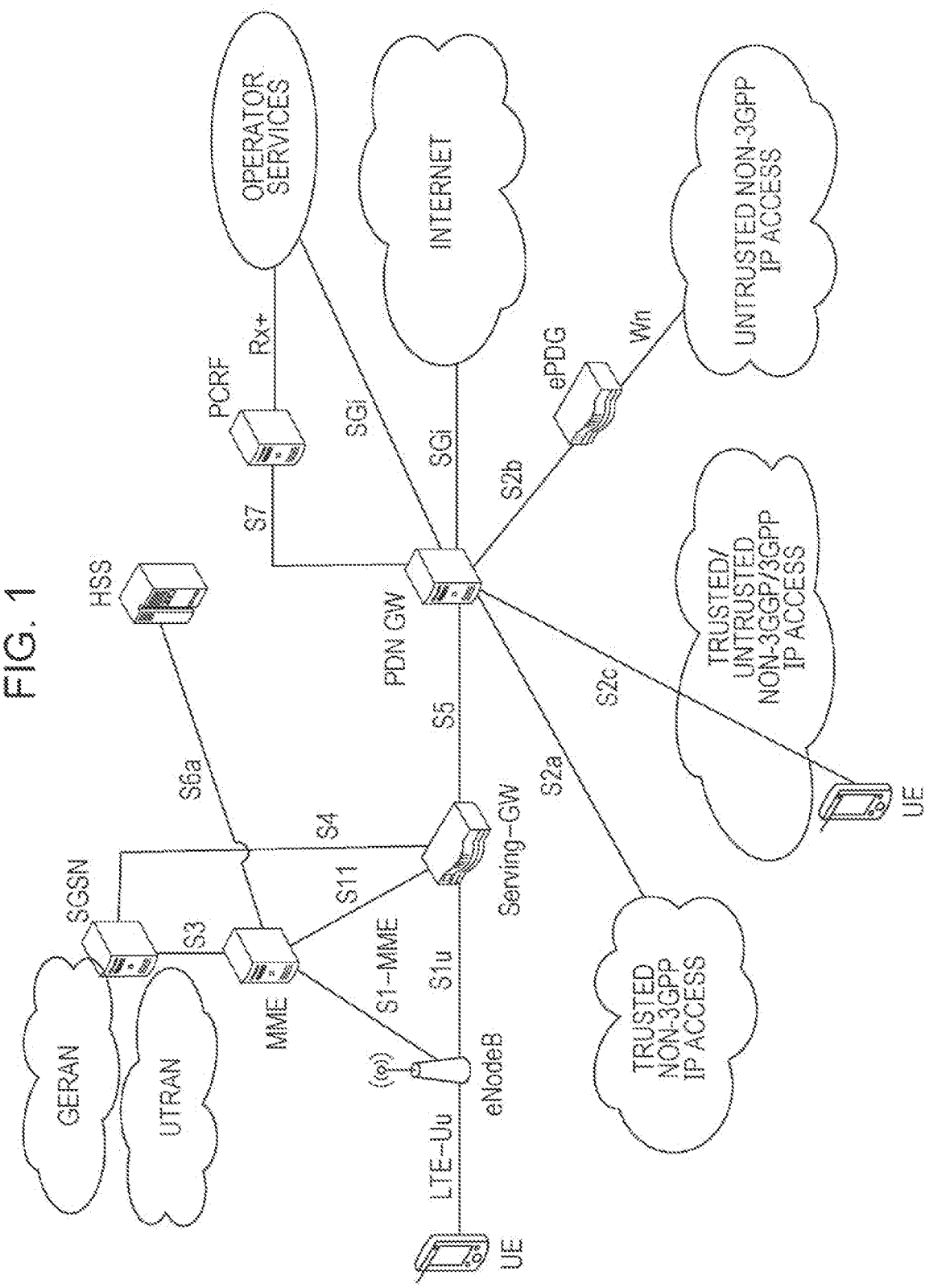
FIG. 1 shows an exemplary architecture of a 3GPP LTE system.
Figure 2:
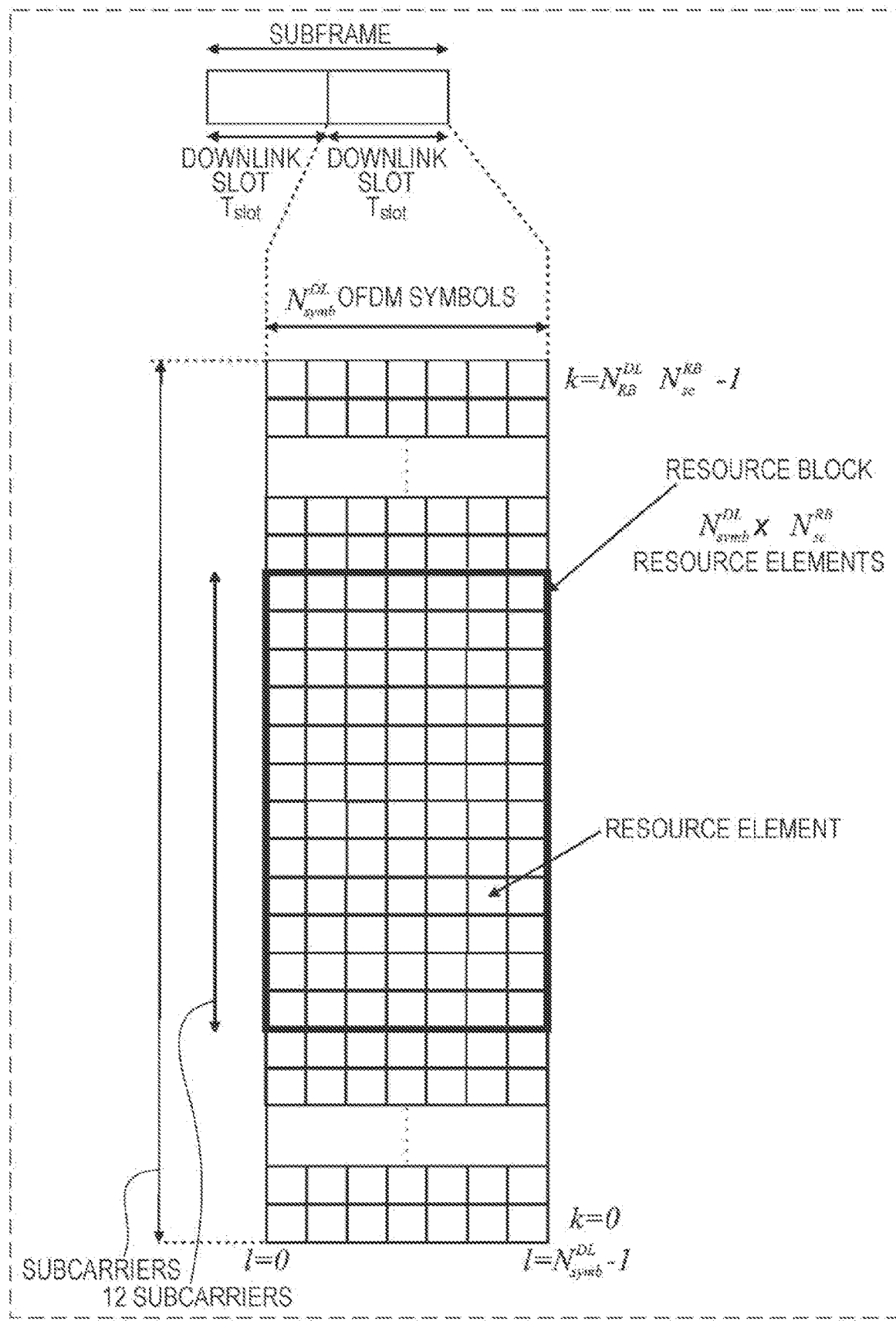
FIG. 2 shows an exemplary downlink resource grid of a downlink slot of a subframe as defined for 3GPP LTE (Release 8/9)
Figure 3B:
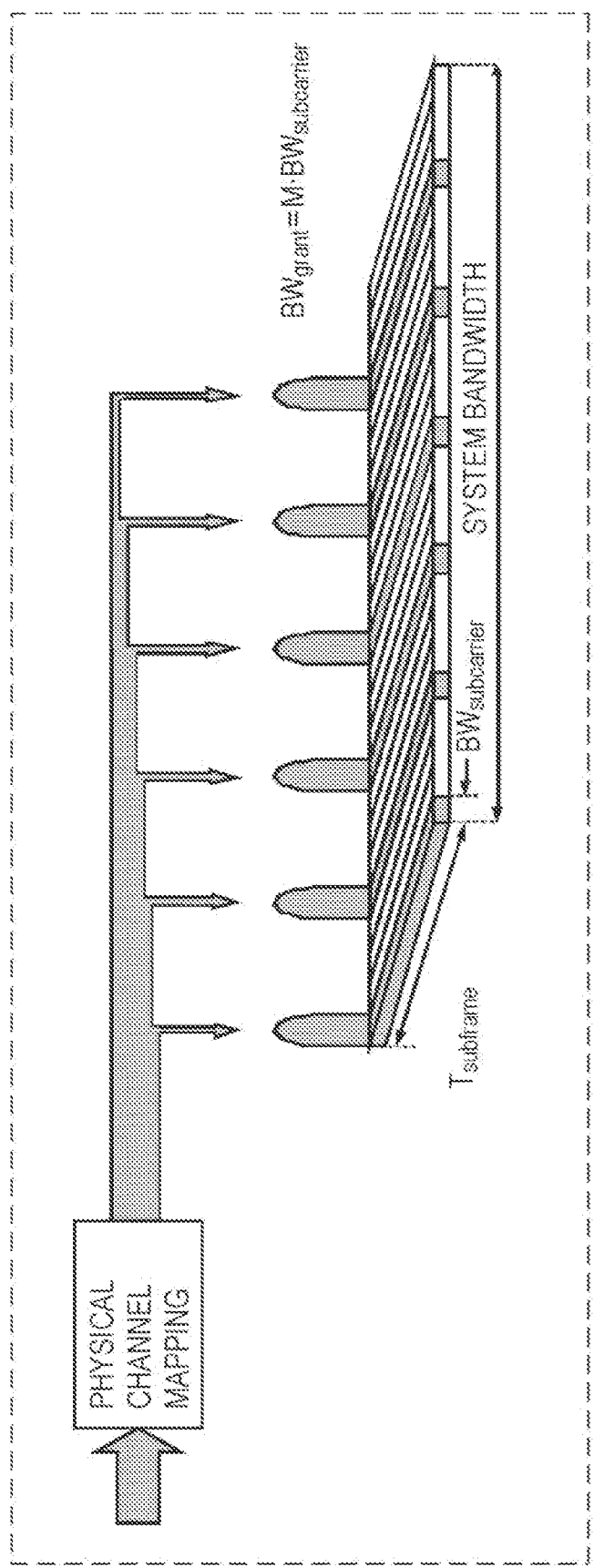
FIG. 3B illustrates a distributed allocation of the frequency resources.
Figure 4:
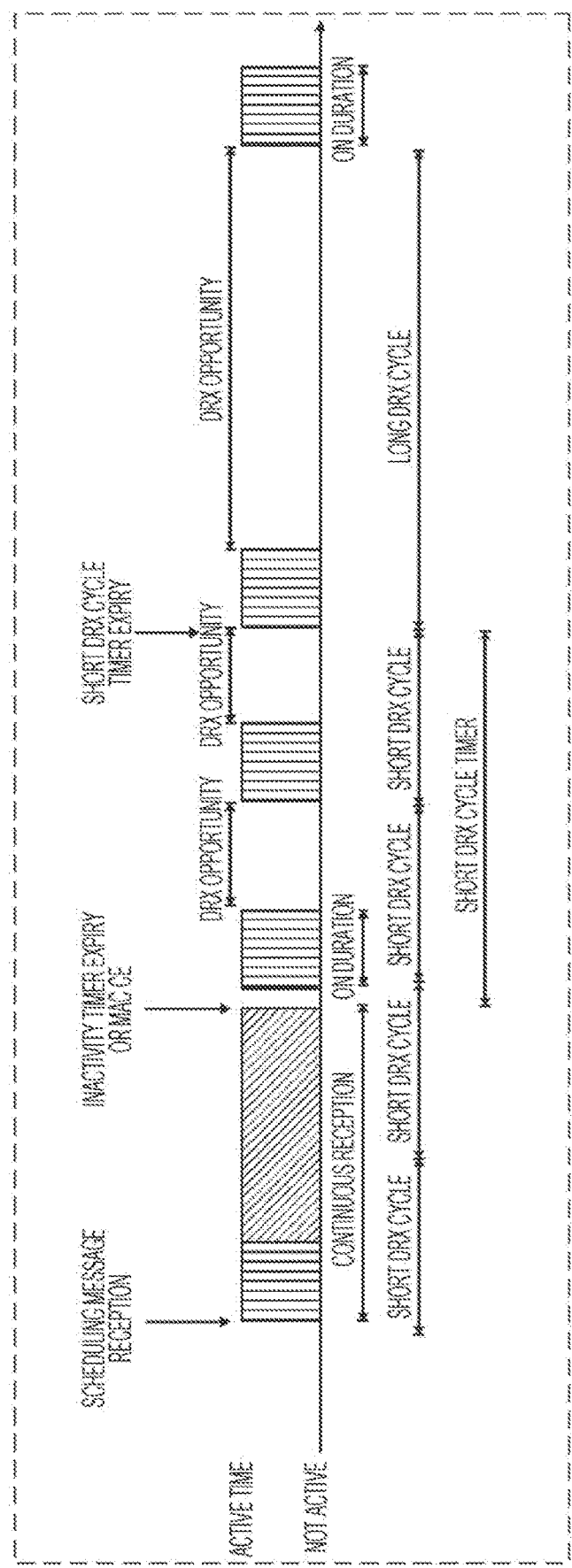
FIG. 4 illustrates the discontinued reception procedure and the corresponding short and long DRX cycles.
Figure 5B:
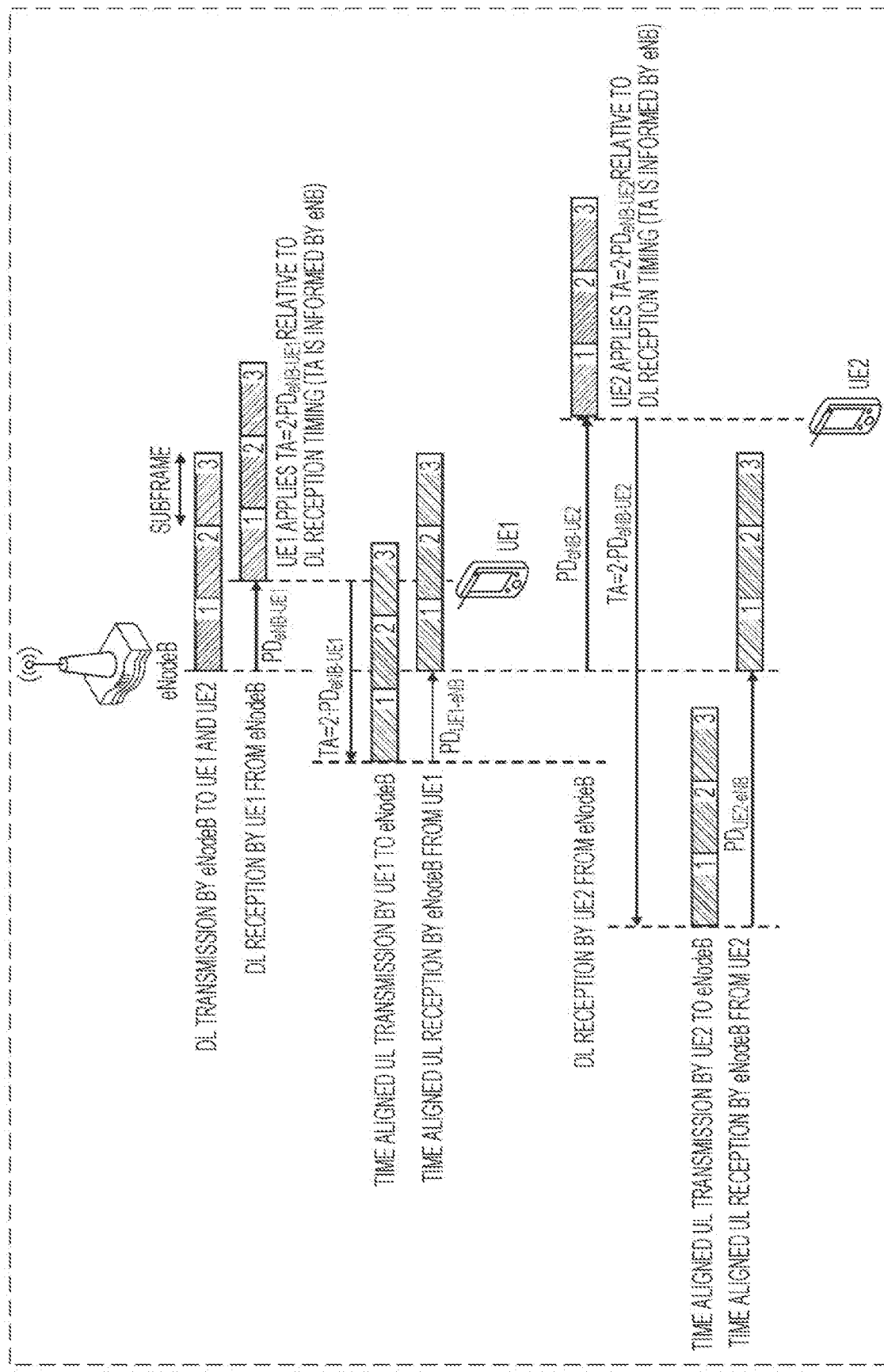
FIG. 5B illustrates a synchronized uplink transmission for two mobile terminals.

In LTE/LTE-A, the frequency-time resources are organized into resource blocks (RBs), where one RB consists of 12 consecutive subcarriers in the frequency domain and one 0.5 ms slot in the time domain as explained in detail before in connection with FIG. 2. In NR, it is expected that some sort of RB concept to describe the minimum resource granularity as well as resource scheduling unit will be also needed. However, the definition of an RB is traditionally tightly connected to the numerology. Hence, when multiple different numerologies are scheduled, the concept of RBs needs to be revisited. This is an ongoing topic in 3GPP.

It further remains unclear how the time-frequency radio resources will be efficiently allocated for the various services according to the different numerologies. In particular, an improved uplink scheduling scheme for the new radio technology is needed.

The present disclosure thus shall present solutions facilitating to overcome one or more of the problems mentioned above.

DETAILED DESCRIPTION OF PRESENT DISCLOSURE

A mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as physical time-frequency radio resources.

The term "numerology scheme" (and other similar terms such as "numerology layer" or "OFDM numerology") as used in the set of claims and in the application is to be broadly understood as referring to how the physical time-frequency radio resources are handled in the mobile communication system, particularly how these resources are partitioned into resource scheduling units to be allocated by a scheduler (e.g. in the radio base station). Put differently, a numerology scheme can also be considered as being defined by the parameters used to partition the above-mentioned physical time-frequency radio resources into resource scheduling units, such as the subcarrier spacing and corresponding symbol duration, the TTI length, the number of subcarriers and symbols per resource scheduling unit, the cyclic prefix length, search space details etc.; these parameters may be called L1 (Layer 1) parameters, since they are mainly used in the physical layer to perform the uplink transmission and to receive downlink transmissions.

The term "resource scheduling unit" shall be understood as a group of physical time-frequency radio resources being the minimum unit that can be allocated by a scheduler. A resource scheduling unit thus comprises time-frequency radio resources, composed of one or more contiguous subcarriers for the duration of one or more symbols, according to the particular characteristics of the numerology scheme.

The term "logical channel" as used in the set of claims and in the application may be understood in a similar manner as already known from previous standards for LTE and LTE-Advanced, i.e. as an abstract concept for handling the data transfer of services. Nevertheless, in LTE/LTE-A systems the term logical channel is closely related to the RLC layer, which however does not have to be the same in future releases for 5G. Although the term logical channel has already been used in connection with the new 5G development, it is not yet decided whether and how exactly this term is defined and/or related to a possible RLC layer in the user equipment. Consequently, in the present application it is exemplarily assumed that a logical channel defines what type of information is transmitted over the air, e.g. traffic channels, control channels, system broadcast, etc. Data and signaling messages are carried on logical channels between the protocol layers e.g. between RLC and MAC layer in LTE. Logical channels are distinguished by the information they carry and can be classified in two ways. Firstly, logical traffic channels carry data in the user plane, while logical control channels carry signaling messages in the control plane Furthermore, a logical channel has associated certain parameters like a logical channel priority or other parameters which should ensure that the Quality of Service requirements of the data carried by the logical channels is fulfilled, e.g. during logical channel prioritization procedure. There is a one-to-one mapping between radio bearer and logical channels. Data of one radio bearer is mapped to one logical channel.

The term "data transmission usage scenario" or simply "usage scenario" as used in the set of claims and in the application may be understood broadly as a range of use cases for mobile/stationary terminals. Exemplarily, a usage scenario as studied for the new 5G study item can be e.g. the eMBB, mMTC, or URLLC as introduced in detail in the background section.

The new radio technology will be evolving from the radio technology already defined for LTE(-A), although several changes can be expected so as to meet the requirements for 5G mobile communication systems. Consequently, particular exemplary implementations of the various embodiments could still reuse procedures, messages, functions etc. already defined for the LTE(-A) communication systems (according to Release 10/11/12/13/14 etc.) as long as they are equally applicable to the new radio technology for 5G communication systems and as long as they are applicable to the various implementations as explained for the following embodiments. Some of these LTE(-A) procedures that could be relevant for the present disclosure are summarized in the background section.

As explained in the background section, different numerologies schemes are foreseen to be supported in the new 5G mobile communication systems. In particular, eNodeBs and user equipments shall support one or more numerologies schemes at the same time, so as to simultaneously be able to participate in numerous services e.g. eMBB, URLLC, mMTC. There is an ongoing discussion on how the uplink radio resource allocation can be implemented in such a new environment. In general, two different modes are being discussed for the uplink scheduling, the eNodeB-controlled transmission mode and the grant-free transmission mode. However, there have been no detailed discussions on these modes nor have agreements been reached on how these modes can be implemented. Consequently, there is a need for an improved radio resource allocation procedure to allocate radio resources in the uplink usable by a user equipment to perform transmissions.

The following exemplary embodiments provide an improved radio resource allocation procedure for the new radio technology envisioned for the 5G mobile communication systems for solving the above-mentioned problem(s). Different implementations and variants of the embodiment will be explained as well. Only very few things have been agreed on with regard to the 5G mobile communication system such that many assumptions have to be made in the following so as to be able to explain the principles underlying the present disclosure. These assumptions are however to be understood as merely examples that should not limit the scope of the disclosure. A skilled person will be aware that the principles of the present disclosure as laid out in the claims can be applied to different scenarios and in ways that are not explicitly described herein.

Moreover, terms used in the following to explain the embodiments are closely related to LTE/LTE-A systems, even though specific terminology to be used in the context of the new radio access technology for the next 5G communication systems is not decided yet. Consequently, a skilled person is aware that the present disclosure and its scope of protection should not be restricted to particular terms exemplary used herein for lack of newer terminology but should be more broadly understood in terms of functions and concepts that underlie the present disclosure.

Figure 8:
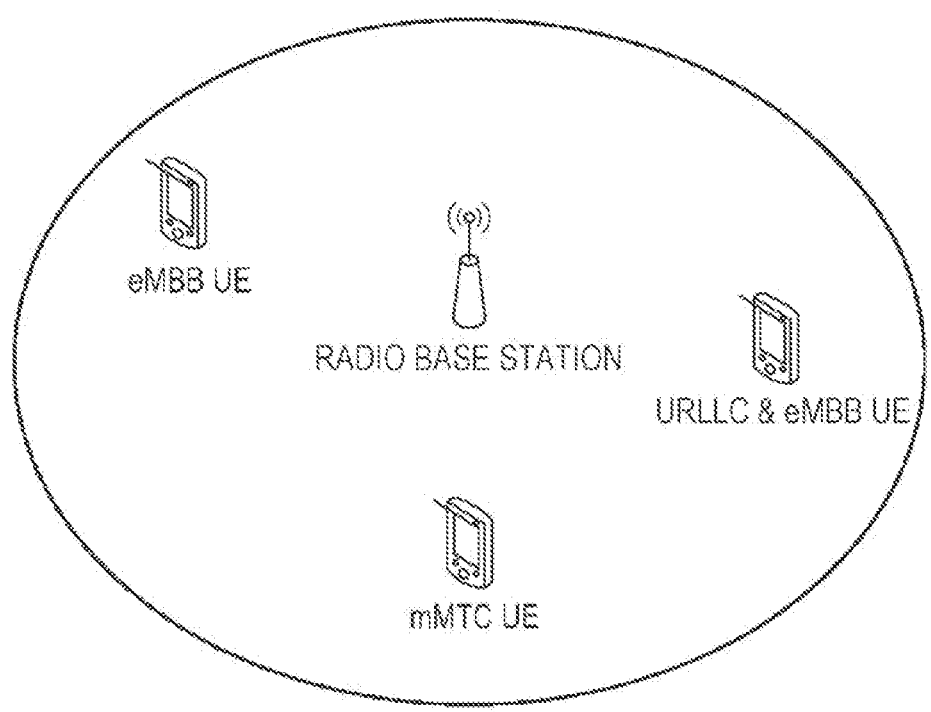
FIG. 8 illustrates a simple deployment scenario with a radio base station and three user terminals.

A simple and exemplary scenario is assumed with a radio base station and several user terminals, as illustrated in FIG. 8. The three illustrated UEs respectively support different services, namely the mMTC, eMBB, and URLLC services already introduced in the background section. As illustrated, it is assumed that one UE shall support and be configured for two different services, exemplarily URLLC and eMBB services.

As discussed in the background section, it is agreed that for the next-generation 5G several different numerologies are to be supported and shall coexist in the mobile communication system, the different numerology schemes being adapted to particular service types, such as the eMBB, mMTC, or URLLC. It should be noted that the 3GPP standardization is at the very beginning and there is a lot of uncertainty as to which and how exactly particular services will actually be supported. However, for the following explanations it is exemplarily assumed that several services (e.g. eMBB, mMTC, and URLLC) shall be supported simultaneously by a communication system so as to allow data transmissions for each of these services.

Correspondingly, at least one respective numerology scheme for each of the services will be presumably defined, where the different numerology schemes allow partitioning the available time-frequency radio resources of a frequency band (such as a carrier of a particular bandwidth, e.g. 100 MHz, below 6 GHz) into resource scheduling units that can be allocated by a scheduler, e.g. being located in an eNodeB. For the exemplary scenario that will be used in the following for illustration purposes, the bandwidth of the frequency band is assumed to be 4.3 MHz. The embodiments and principles can be equally applied to different frequency bands and bandwidths.

In general, numerology schemes are characterized by different parameters such as the subcarrier spacing and the symbol duration (being directly related to each other), the number of subcarriers per resource scheduling unit, the cyclic prefix length, or the TTI length (scheduling time interval; defined by the number of symbols per resource scheduling unit or the absolute time duration per resource scheduling unit from which the number of symbols can be derived). Consequently, numerology schemes may differ from one another by one or more of these numerology characteristics. By appropriately determining the numerology characteristics, one numerology scheme can be tailored to a particular service and its requirements (such as latency, reliability, frequency diversity, data rates etc.). For instance as explained in the background section, the services eMBB and URLLC are similar in that they both demand a very broad bandwidth, however are different in that the URLLC service requires ultra-low latencies. These requirements may result in that a numerology scheme for URLLC services will typically use shorter TTIs (and possibly shorter symbol lengths) than a numerology scheme for the eMBB service. There are no agreements yet on the numerology characteristics to be used for each service.

As will become apparent from below, the main numerology characteristics that differ between the numerology schemes exemplary used for illustrating the principles of the embodiments are the subcarrier spacing and symbol duration as well as the length of the scheduling time interval (i.e. the number of symbols per resource scheduling unit). Although not illustrated in the figures, the length of the cyclic prefix is assumed to be scaled in the same manner as the symbol length, while it is exemplarily assumed that each numerology scheme partitions the radio resources such that a resource scheduling unit has 12 subcarriers with respective subcarrier spacings according to the numerology scheme. Nevertheless, it should be noted that the embodiments and underlying principles are not restricted to merely those different numerology schemes used exemplarily in the following, but can be applied to different numerology schemes and corresponding different numerology characteristics of same. And although in the following explanations only three numerology schemes are defined in total, the principles will equally apply when different sets and different numbers of numerology schemes are defined for the mobile communication system.

Figure 6A:
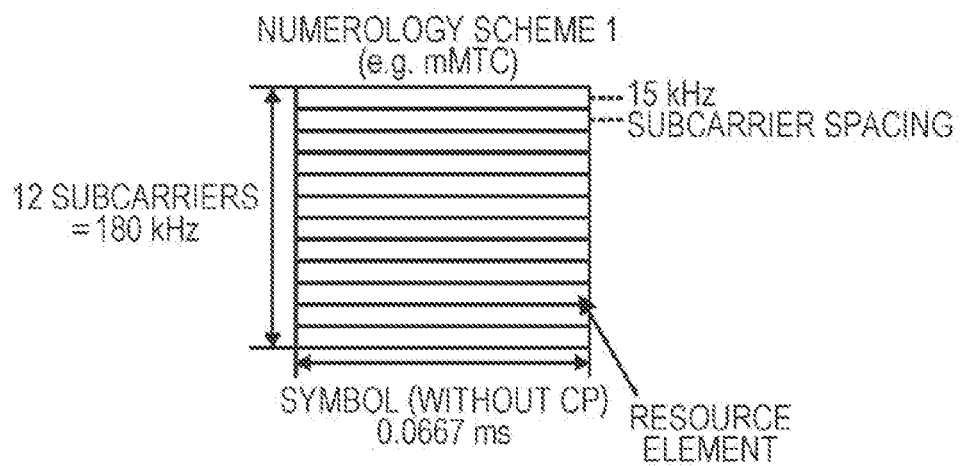
FIG. 6A illustrates subcarrier spacing 15 kHz and the resulting symbol duration.
Figure 6B:
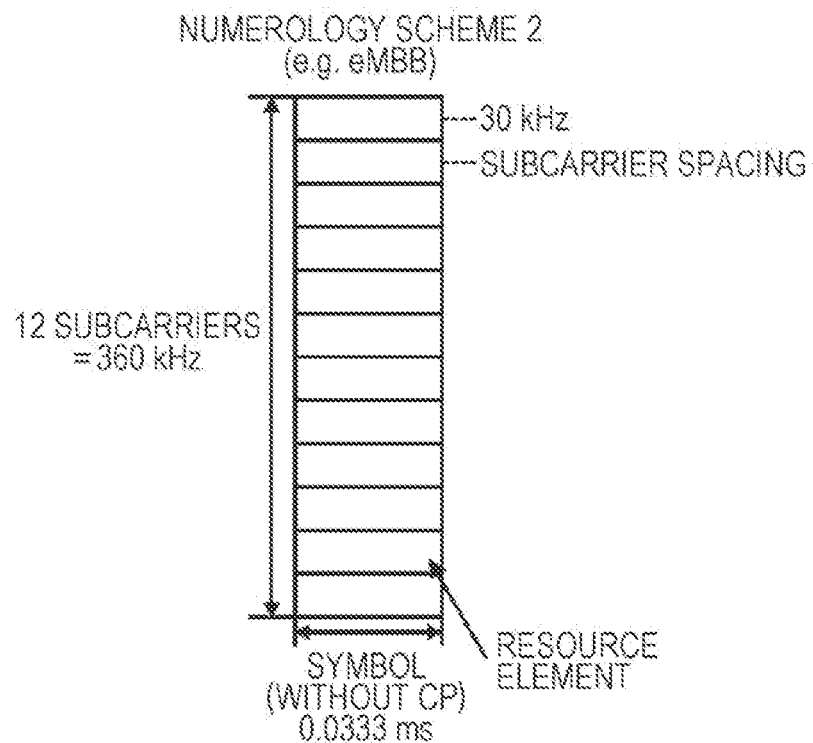
FIG. 6B illustrates subcarrier spacing 30 kHz and the resulting symbol duration.
Figure 9:
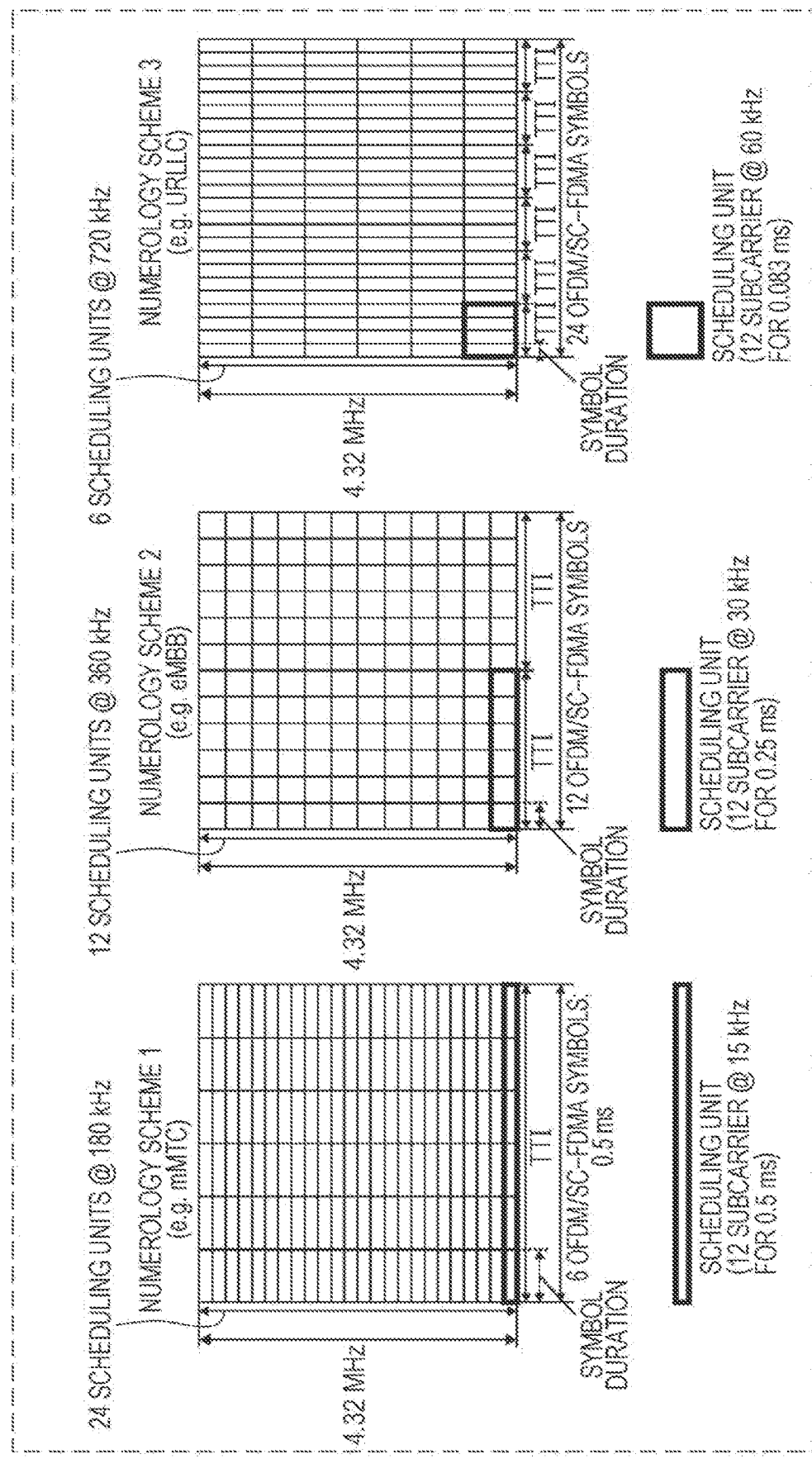
FIG. 9 illustrates the partitioning of radio resources according to three different numerologies schemes into corresponding resource scheduling units.

The different exemplary numerology schemes will be illustrated in connection with FIG. 9 and are based on FIG. 6A to FIG. 6C. FIG. 9 is a simplified illustration of the partitioning of radio resources according to three different numerology schemes. The resulting resource scheduling units are illustrated with a bold square in each of the numerology schemes.

Numerology scheme 1 of FIG. 9 is characterized by having a subcarrier spacing of 15 kHz (with a resulting symbol duration of 66.7 µs; see FIG. 6A), 12 subcarriers and 6 symbols per resource scheduling unit. The resulting resource scheduling unit has a frequency bandwidth of 180 kHz and a length of 0.5 ms (when exemplary considering a cyclic prefix of each 16.7 µs, as e.g. known from LTE systems). Correspondingly, in the frequency domain the bandwidth of the frequency band will be partitioned into 24 resource scheduling units (each with 180 kHz bandwidth). With these numerology characteristics, numerology scheme 1 may be considered for the transmission of data for the mMTC service. A UE following that numerology scheme could thus be theoretically scheduled by the scheduler every TTI, i.e. 0.5 ms.

Numerology scheme 2 is characterized by having a subcarrier spacing of (2×15 kHz=) 30 kHz (with a resulting symbol duration of 33.3 µs; see FIG. 6B), 12 subcarriers and 6 symbols per resource scheduling unit. The resulting resource scheduling unit has thus a frequency bandwidth of 360 kHz and a length of 0.25 ms (when exemplary considering a scaled cyclic prefix of 16.7 µs/2 each). Correspondingly, in the frequency domain the bandwidth of the frequency band will be partitioned into 12 resource scheduling units (each with 360 kHz bandwidth). With these numerology characteristics, numerology scheme 2 may be considered for the transmission of data for the eMBB service. A UE following that numerology scheme could thus be theoretically scheduled by the scheduler every TTI, i.e. 0.25 ms.

Numerology scheme 3 is characterized by having a sub-carrier spacing of (4×15 kHz=) 60 kHz (with a resulting symbol duration of 16.7 µs; see FIG. 6C), 12 subcarriers and 4 symbols per resource scheduling unit. The resulting resource scheduling unit has thus a frequency bandwidth of 720 kHz and a length of 0.0833 ms (when exemplary considering a scaled cyclic prefix of 16.7 µs/4 each). Correspondingly, in the frequency domain the bandwidth of the frequency band will be partitioned into 6 resource scheduling units (each with 720 kHz bandwidth). With these numerology characteristics, numerology scheme 3 may be considered for the transmission of data for the URLLC service. A UE following that numerology scheme could thus be theoretically scheduled by the scheduler every TTI, i.e. 0.0833 ms.

Consequently, the time-frequency radio resources of the frequency band that are to be shared among the different numerologies can be interpreted differently based on the numerology characteristics underlying the different numerology schemes. The different numerology schemes shall coexist in the mobile network, and radio resources of the different numerology schemes should be available for being allocated to user terminals as needed.

Figure 7:
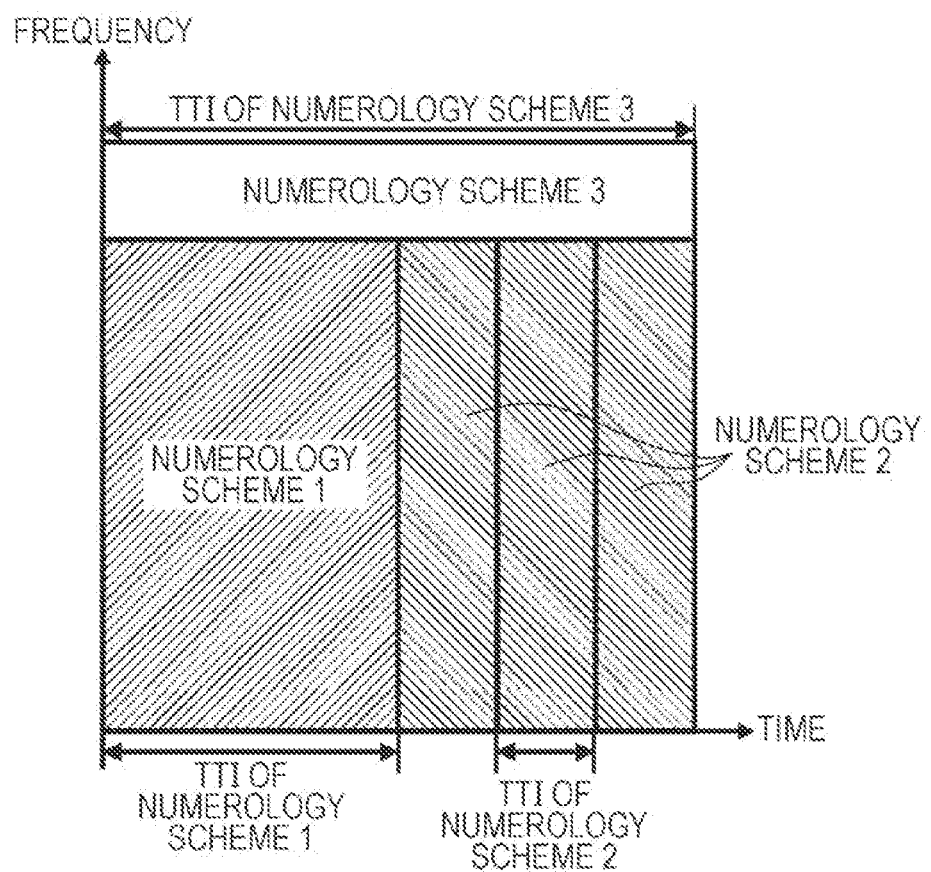
FIG. 7 illustrates an exemplary multiplexing of different OFDM numerologies in both the time domain and the frequency domain.

As discussed in the background section, there are several possibilities on how to multiplex the different numerologies within the frequency band and its radio resources in the frequency domain and/or the time domain, where FIG. 7 shows but one example. There are other possible multiplexing schemes that may be equally be used. In general, so as to be able to allocate radio resources for data transmissions according to each numerology scheme, the available time-frequency radio resources of the frequency band should be split in an appropriate manner between the different numerology schemes coexisting in the system. Correspondingly, each numerology scheme is associated to a particular set of radio resources among the available radio resources of the frequency band which are then usable by the scheduler (such as the radio base station) for being allocated according to that numerology scheme, i.e. so as to allocate radio resources to transmit data for the corresponding service (here URLLC, mMTC, mMBB) following the numerology characteristics of the particular numerology scheme. In view of that the traffic amount for each service varies with time, this multiplexing of different coexisting numerology schemes for the services may also be flexible.

According to the embodiments and variants thereof, an improved radio resource allocation procedure shall be provided that allows the eNB to control the uplink resource allocation for UEs configured with at least one of the above discussed numerology schemes.

Different UEs will support different numerology schemes. Low-cost UEs may only support one type of service, e.g. of type mMTC, and will thus only support the corresponding numerology scheme(s) suitable to that type of service (i.e. usage scenario). On the other hand, it is expected that other UEs will be capable to operate according to various or even all the possible numerology schemes in order to be able to support data transmissions in all usage scenarios. One UE is exemplarily assumed to be configured with two different services, one eMBB service and one URLLC service (see FIG. 8). Depending on the circumstances (such as the radio cell and the eNB a UE is connected with, the services it is currently having etc.), the UE will be configured to operate according to one or more of its supported numerology schemes. This may exemplary be done when connecting to a radio cell, where the corresponding eNB will configure the UE to operate according to some or all of those numerology schemes that it itself supports in its radio cell. The exact procedure of how this can be achieved is not yet known, and some of the details are not essential to the present disclosure. Nevertheless, one possible approach in said respect could be that e.g. when applying to a service, the eNodeB configures the UE with the suitable numerology scheme for that service for which the UE is applying. For example when the UE has new traffic to send, or learns about the network's intent to send new traffic, it sends the MME a Service Request message. During a subsequent bearer establishment procedure, the bearers and connections in the EPS bearer (i.e. DRB, S1 bearer and S5 bearer) and the signaling connection (i.e. ECM connection, S11 GTP-C and S5 GTP-C tunnels) are now established to support traffic delivery between the UE and the network (UE through P-GW). The eNB further sends an RRC CONNECTION RECONFIGURATION MESSAGE to the UE, which specifies the information received from the MME along with the new radio bearer configuration data. The UE configures the bearer as instructed and acknowledges this with an RRC CONNECTION RECONFIGURATION COMPLETE message to the eNB. Now, the eNB acknowledges with the E-RAB SETUP RESPONSE message. Within the RRC Connection reconfiguration message the eNB could configure the UE with the numerology scheme to be applied for the new bearer respectively logical channel.

Overall, the UE shall be aware of the numerology schemes with which it is configured and of the corresponding parameters associated with the configured numerology scheme(s).

According to one option, the eNB may keep a list of numerology schemes supported in its radio cell, together with the corresponding associated parameters such as sub-carrier spacing, TTI length, symbols per scheduling interval, and possibly also other information relevant to the numerology schemes such as the search space details, the UL/DL nominal set configuration. An index for each numerology scheme may be provided for ease of reference in later procedures (such as the improved radio resource allocation procedure discussed below). The eNodeB can broadcast information on the supported numerology schemes in its radio cell as part of the system information broadcast (SIB). There is an ongoing discussion for 5G to differentiate between essential system information which is continuously broadcast by the eNodeB and non-essential (may also be termed "other") system information that shall only be provided on demand. The distinction is made so as to allow reducing complexity and overhead (e.g. in scenarios where beamforming is used). Correspondingly, the information on the supported numerology schemes could be broadcast as part of the essential system information. In case of numerology-specific Random access configuration(s), i.e. the RACH configuration is different for each numerology scheme, the L1 parameter(s) associated with a given numerology scheme should be broadcast in the cell.

Alternatively, the information on the supported numerology schemes and the associated L1 parameter(s) could be signaled as part of the non-essential system information, i.e. signaled directly to the UE when required/requested.

Alternatively or in addition, numerology schemes and the corresponding parameters may be already fixed e.g. in the standards or in the (U)SIM card of a mobile phone that is provided by the operator. In order to easily indicate a particular numerology scheme, a corresponding index can be associated to each numerology scheme. Consequently, the numerology schemes and their parameters are widely known and can be easily referenced by merely providing the index, instead of having to transmit/broadcast all the necessary information on the numerology scheme(s) and the corresponding parameters thereof. For instance, the eNodeB may regularly broadcast only corresponding indices of those numerology schemes that are supported in its radio cell. Due to the reduced overhead, the indices may easily be broadcast in the essential system information, but could theoretically be signaled on demand as part of non-essential system information.

Furthermore, the UE is exemplarily assumed to be configured with a plurality of logical channels each of which can be associated with at least one of the configured numerology schemes. In more detail, as known from LTE(-A) UEs, logical channels are configured/established when radio bearers are setup/established, e.g. when the UE has new traffic to send or learns about the network's intent to send new traffic. In view of that no procedures have been yet agreed for 5G in said respect, it may be exemplarily assumed that the LTE(-A) procedure will be used in a same or similar manner for 5G-UEs. During the radio bearer setup procedure the logical channel configuration will be provided to the UE, and the eNB configures the associated/linked numerology scheme(s) for the logical channel as part of the logical channel configuration.

In this context, it should be noted that a logical channel will usually be associated with only one numerology scheme, namely that one that is suitable for transmitting the data of that logical channel. However, a logical channel can also be associated with more than one numerology scheme. For instance, there can be services for which several numerology schemes are defined, particularly when service provision can benefit from the different numerology schemes. For instance, an eMBB service such as TCP can use either a lower-frequency spectrum or the millimeter frequency spectrum. More in detail, the transmission control protocol (TCP) involves a slow-start phase where a larger subcarrier spacing provides gains due to the smaller symbol length, whereas during a later phase during which data shall be transmitted at full speed a smaller subcarrier spacing might be more efficient. As a result, a logical channel being set up for the TCP service can be associated with two numerology schemes differing at least with regard to their subcarrier spacing. More in particular, the UE would transmit data packets of the logical channel preferably during the slow-start phase using a numerology scheme with a larger sub-carrier-spacing and during the congestion phase on a numerology scheme with smaller subcarrier spacing. In order to allow such behavior, the UE Access Stratum (AS), e.g. MAC layer, would need to be aware of the different phases/states of the TCP protocol. Therefore, according to one exemplary implementation, the application layer indicates to the AS the state of the TCP protocol, i.e. slow-start phase respectively congestion control phase. The AS layer, e.g. MAC layer, uses this information in order to map the data packet of the logical channel to the corresponding numerology layer.

In general, for the case that a logical channel is mapped to multiple numerology layers/schemes, the UE behavior for routing packets needs to be specified. For instance, the UE when being scheduled for one of the numerology layers might transmit as much data as possible. In that case, there would be basically no additional criteria for the routing of data packets. According to another exemplary embodiment, the UE could prefer the transmission of data using one numerology compared to another numerology. For example when a logical channel is mapped to two numerology layers/schemes, one numerology used on a lower frequency band and one on a higher frequency band, i.e. millimeter wave spectrum, the UE might try to optimize data transmission on the higher frequency band (since higher data rates are to be expected on the higher frequency band). Another criterion might be the header overhead, i.e. trying to minimize L2 header overhead when generating a TB, when selecting the numerology layer for transmitting data. In general, the UE behavior should be that UE reports the buffer status report for the logical channel, and subsequently the eNB decides on which numerology layer to schedule the UE (as well as the size of the resource allocation).

Consequently, a mapping is thus established in the UE associating logical channels with the corresponding numerology scheme(s).

After having thus configured the service(s), the suitable numerology schemes and after having set up logical channels in said respect, the eNodeB will control the uplink scheduling for the UE during service provision. As mentioned before, a general discussion is ongoing in 3GPP as to which scheduling modes will be supported for uplink scheduling. The current discussion is at the moment focusing on two types of scheduling modes, an eNB-controlled scheduling mode and a grant-free scheduling mode.

Generally, the eNodeB-controlled scheduling mode is characterized in that the UE will not autonomously perform uplink transmissions but will follow corresponding uplink scheduling assignments provided by the eNodeB. The eNodeB-controlled scheduling mode allows the eNodeB to control radio resource usage in its radio cell and thus to avoid collisions between uplink transmissions of various user equipments. However, uplink transmissions are significantly delayed since the UE has to first request and then receive a suitable uplink grant before performing the uplink transmissions. On the other hand, a grant-free scheduling mode allows the UE to immediately perform uplink transmissions in certain circumstances without having to request or receive a corresponding resource allocation from the eNodeB, thereby significantly reducing the delay. Suitable radio resources usable for such a grant-free uplink transmission may for instance be defined previously e.g. by the eNB (may be termed resource pools). Such a transmission is contention-based and thus prone to collisions with other uplink transmissions. Moreover, in view of the ongoing discussions and the very early stage of standardization, also other scheduling modes may be defined in the future, and the present disclosure shall not be constrained to merely the two above discussed scheduling modes. Generally speaking, it is likely that at least two different scheduling modes will be available for uplink scheduling, one of which allows for fast but possibly less reliable uplink transmissions (could be termed fast resource allocation mode) and the other of which allows for reliable but delayed uplink transmissions (could be termed eNB-controlled resource allocation mode).

The logical channels may be configured with a particular uplink scheduling mode, e.g. one of the two above-presented scheduling modes currently being discussed in 3GPP for 5G. Only certain logical channels are allowed to use the grant-free scheduling mode, for instance logical channels set up for services with very stringent latency requirements such as services for a URLLC usage case, e.g. for mission-critical transmissions.

The present embodiments and variants are focusing on the eNB-controlled scheduling mode according to which the UE will receive an uplink scheduling assignment from the eNB, assigning uplink radio resources to be used by the eNB for uplink transmissions.

Figure 10:
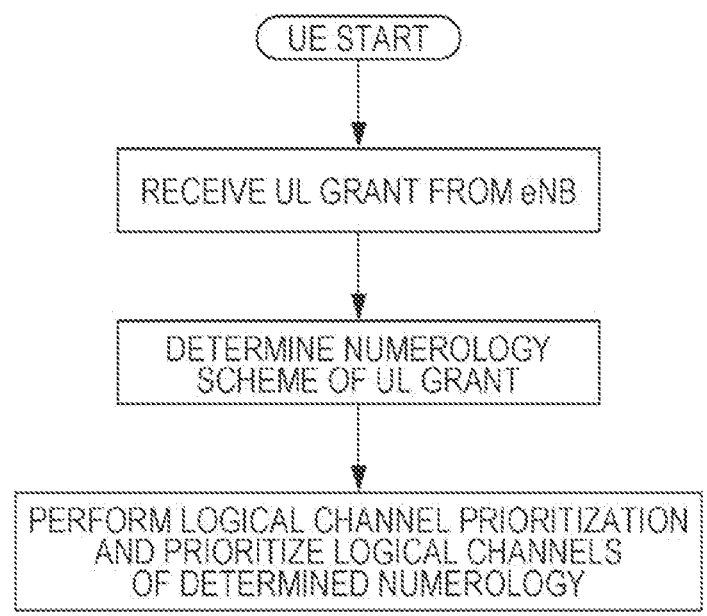
FIG. 10 is a flow diagram illustrating the UE behavior for one exemplary embodiment.

The uplink scheduling grants provided by the eNB can be made specific to a numerology scheme, i.e. the radio resources assigned by the eNB are to be only applied to a certain numerology scheme as decided by the eNB. Correspondingly, the UE, upon receiving an uplink scheduling assignment from the eNB, determines for which numerology scheme the uplink scheduling assignment is intended. Then, when processing the received uplink scheduling assignment, the UE will perform the logical channel prioritization procedure on that basis by appropriately allocating the assigned radio resources to the configured logical channels and additionally prioritizing those logical channels that are associated with the intended numerology scheme of the received uplink scheduling assignment. Prioritizing the logical channels in this context can also mean that the assigned radio resources are to be exclusively used for transmitting data of only those logical channels that are associated with the intended numerology scheme. FIG. 10 is an exemplary flow diagram illustrating this basic UE behavior.

In the following, various detailed embodiments will be presented. There are several possibilities on how the UE may determine the intended numerology scheme of a received uplink scheduling assignment. One option is that the eNB includes a corresponding numerology layer indication within the uplink scheduling assignment, such that the UE determines the intended numerology layer/scheme from that indication and a corresponding table at the UE linking the indexes with the supported/configured numerology layers. In more detail, the DCI conveying the uplink resource allocation may exemplarily contain an index which refers to the list of numerology schemes and associated L1 parameters broadcast by the eNB in the system information. An index with the value 1 for instance refers to the first entry of the numerology information broadcast, etc. Alternatively, the index could refer to a list of numerology schemes/L1 parameters preconfigured in the UE.

Another option is that the eNB uses different RNTIs for different numerology schemes when generating the uplink scheduling assignment such that the UE can derive the intended numerology scheme from the RNTI used by the eNodeB for the encoding process. In particular, in present systems, a UE identity (e.g. the C-RNTI, Cell-Radio Network Temporary Identifier) is used by the eNB for scrambling the CRC-(cyclic redundancy check)-part of an uplink scheduling assignment so as to allow the UE to identify which uplink scheduling assignments are intended for itself. In order to differentiate the numerology schemes, various RNTIs could be defined by the eNodeB each of which being associated unambiguously with one numerology scheme configured for the UE. When generating the uplink scheduling assignment for a particular UE, the eNodeB uses the particular UE-specific and numerology-specific RNTI to encode the uplink scheduling assignment, e.g. by scrambling its CRC part as already known from current LTE/LTE-A systems.

Still another option is that different numerology schemes are differentiated through different search spaces via which the uplink scheduling assignments are transmitted. In particular, as already done in LTE/LTE-A, a control information region (can also be denoted uplink scheduling assignment search space, or Downlink Control Information (DCI) search space) can be defined, such that part of these radio resources can then be used by the scheduler (e.g. radio base station) to transmit control information such as the resource allocation information to the UEs. Correspondingly, each UE should monitor respective control information region(s) in order to see whether control information is present that is actually destined to itself. It is currently unclear whether and how search spaces will be defined for the new radio access technology of 5G. Generally, it could be assumed that the control information is transmitted in the same numerology scheme as the data for which the control information is transmitted. Consequently, for a UE that supports multiple services and respective numerology schemes, individual search spaces could be defined for each numerology scheme, such that the UE can determine the numerology scheme from that search space via which the received uplink scheduling assignment was transmitted by the eNodeB.

This approach has the advantage that no additional information in the uplink scheduling assignments (DCI) is needed and no data overhead is generated in said respect. On the other hand, it may have the disadvantage that it may preferably be only applied in systems where the search spaces for different numerology schemes are clearly separated, thus allowing an unambiguous determination of the intended numerology scheme of the received uplink scheduling assignment based on the search space used for the transmission. The definition of separate search spaces however increases the blind decoding effort on the UE side. The blind decoding effort on the UE side could be reduced by defining a common control information region or by overlapping the different search spaces, in which case however the search space would not unambiguously indicate the intended numerology scheme. Further information would be necessary for the UE to unambiguously determine the intended numerology scheme.

In any case, after the UE has processed the received uplink scheduling assignment and has determined the intended numerology scheme according to any of the above-mentioned options, the UE operation continuous to prepare the transmission of data. In said respect, the UE will have to somehow select data in its transmission buffers to be transmitted using the uplink radio resources as indicated in the received uplink scheduling assignment. In currently standardized systems for LTE and LTE-A, the UE has an uplink rate control function, also termed a logical channel prioritization procedure, as discussed in detail in the background section. It is exemplarily assumed in the following that also in the new 5G systems a similar function will be performed by the UE, which shall also be called logical channel prioritization procedure. Correspondingly, when a new transmission is to be performed, the UE will generate a data packet (exemplary also termed transport block) to be transmitted in the uplink, and determines which data available for transmission is included in the data packet. As explained before, the uplink scheduling assignment is numerology layer specific, and the LCP procedure shall take this into account by prioritizing during the LCP procedure the data from those logical channels that are associated with the intended numerology layer of the received uplink scheduling assignment. In particular, the radio resources allocated by the received uplink grant are to be used preferably to transmit data from those logical channels associated with the intended numerology layer. However, should radio resources remain after having allocated radio resources for transmitting all pending data of logical channels of the intended numerology layer, the remaining radio resources could also be used to transmit data of logical channels that are associated with other numerology layers.

One variant of the prioritization is that the radio resources assigned by the received uplink grant are to be used only for data of those logical channels associated with the intended numerology layer; i.e. the radio resources shall not be used to transmit data of logical channels associated with other numerology layer(s). In other words, for the logical channel prioritization procedure only logical channels are considered that are mapped to the numerology layer for which the received uplink grant is intended. Although radio resources that remain might be wasted, this exclusive prioritization ensures that the data is always transmitted with the "correct" numerology scheme so as to comply with the data requirements for which the numerology scheme was configured.

According to one exemplary implementation of the above embodiment(s), a common LCP procedure can be performed for logical channels of all numerology layers, where the logical channels are prioritized according to their associated numerology layers as explained above. According to another exemplary implementation, a separate LCP procedure is performed for each numerology layer, in which case the LCP procedure would be performed only over those logical channels that are associated to the respective numerology layer of the LCP procedure. In this case however, only the logical channels of the numerology layer (of the uplink scheduling assignment) would be considered; i.e. a gradual prioritization of logical channels of different numerology layers would thus not be possible.

The common LCP procedure mentioned above could be implemented by providing a common MAC (Medium Access Control) entity in the UE, responsible for handling the common LCP procedure. Similarly, the common MAC entity could also be performing the separate LCP procedures for the different numerology schemes. Alternatively, instead of providing a common MAC entity, separate MAC entities can be provided, one for each numerology layer configured in the UE, so as to implement the separate LCP procedures. The mapping between the logical channels and the MAC entities is based on the mapping between the logical channels and the numerology layers.

Figure 11:
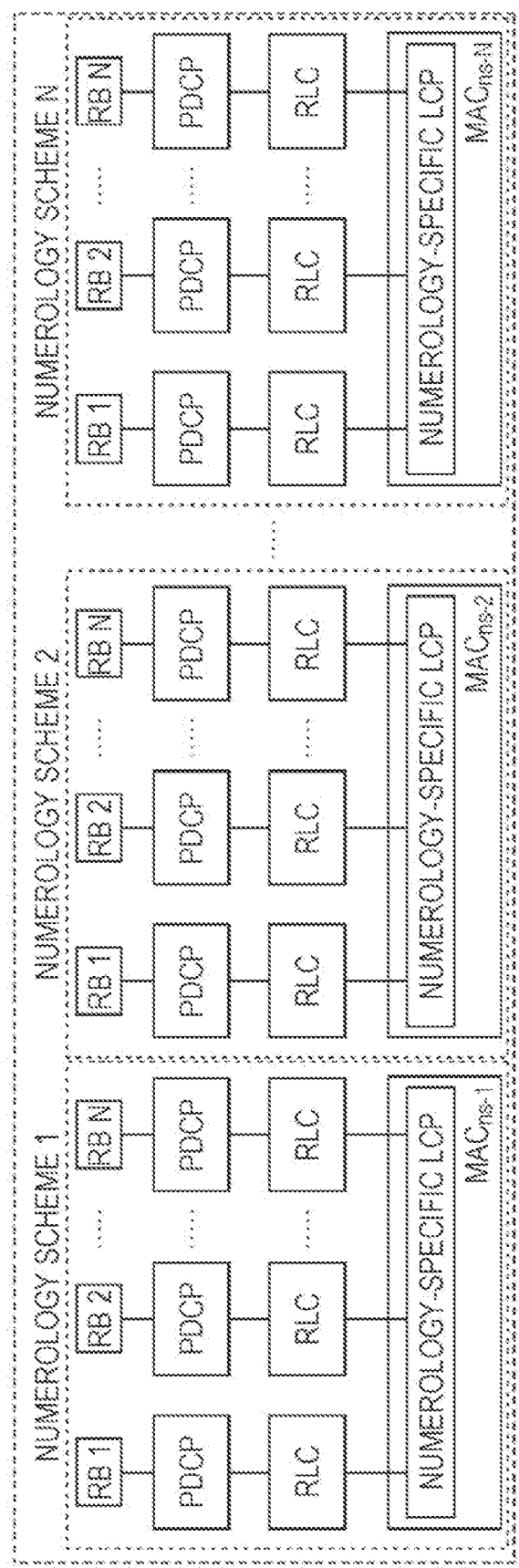
FIG. 11 illustrates the layer structure of the UE according to one exemplary embodiment where numerology-specific LCP procedures as well as MAC entities are provided.
Figure 12:
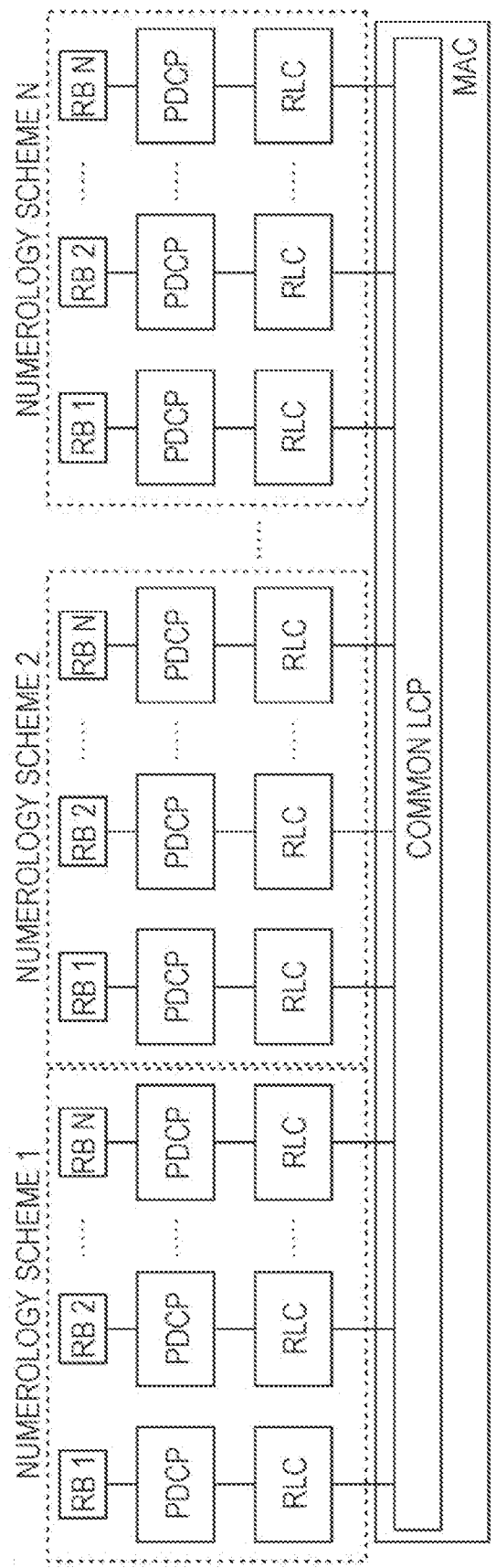
FIG. 12 illustrates the layer structure of the UE according to one exemplary embodiment where a common LCP procedure and MAC entity are provided.
Figure 13:
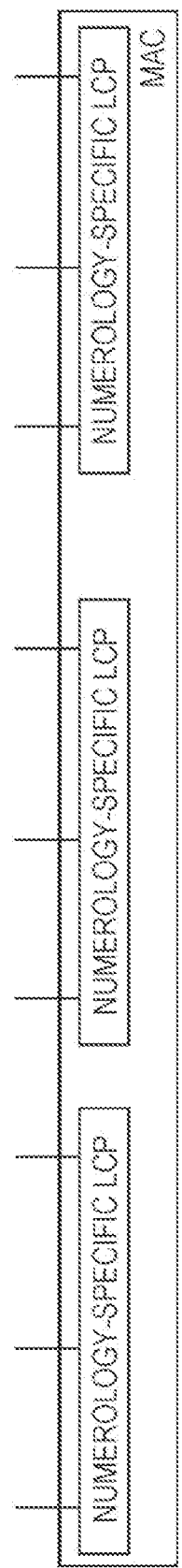
FIG. 13 illustrates the common MAC layer and numerology-specific LCP procedures based on FIG. 12, according to another exemplary embodiment.

FIG. 11 and FIG. 12 illustrate an exemplary layer structure in the user equipment for numerology specific MAC entities and LCP procedures respectively a common MAC entity and a common LCP procedure. As apparent from FIG. 11, each numerology scheme configured in the UE is associated with a separate numerology-specific MAC entity and corresponding LCP procedure. As apparent from FIG. 12, the UE comprises one common MAC entity and LCP procedure for all numerology schemes configured in the UE. Alternatively, as illustrated in FIG. 13, the common MAC entity could perform separate numerology-specific LCP procedures similar to FIG. 11, respectively over only those logical channels associated to one numerology scheme, instead of performing one common LCP procedure over all logical channels in the UE.

In the above discussed implementations, it is exemplarily assumed that the LCP procedure will be part of the MAC entity of a UE, as is the case in current LTE(-A) UEs. However, no agreements have been made yet for 5G in said respect. Correspondingly, it might be decided that the LCP procedure resides in another entity (e.g. the RLC entity), in which case the above discussion shall apply with respect to the other entity.

Exemplarily, a specific implementation of the LCP procedure could be based on the one discussed in the background section with suitable adaptations as follows. The detailed algorithm for the LCP procedure would according to one exemplary embodiment consider for the first three steps (as described in the background section) only those logical channels that are associated to the respective numerology layer. This would ensure that data of those logical channels associated with the respective numerology layer are prioritized. Then, in case there are some remaining resources, i.e. the transport block is not completely filled yet, the LCP procedure as described in the background section, i.e. step 1 to step 3, would then be run for some or all of the remaining logical channels of other numerology layer(s). Essentially, the detailed algorithm would be a two-stage procedure where at each stage the current LCP procedure is run with a different set of logical channels.

Alternatively, when the allocated radio resources are to be exclusively used by those logical channels having an associated numerology scheme as indicated in the resource allocation (uplink grant), only the first stage is performed, i.e. the LCP procedure is run for only those logical channels having an associated numerology scheme as indicated in the resource allocation.

In order to be able to perform the above discussed numerology-specific prioritization of logical channels, in some of the implementations information on the intended numerology layer has to be made available to the LCP procedure, more specifically to the processor or (MAC) entity responsible for performing the LCP procedure. For example, the physical layer of the UE, responsible for decoding the uplink scheduling assignment, may forward the relevant information to a MAC entity of the UE responsible for the LCP procedure(s). In more detail, when using separate MAC entities, the physical layer should provide the grant-specific information (e.g. transport block size, the HARQ information etc. exemplarily in a similar manner as in current LTE/LTE-A systems) of the uplink scheduling assignment to that MAC entity responsible for the numerology layer for which the received uplink grant is intended. In said case, information on the numerology layer could but does not need to be provided to the numerology-specific MAC entity. In case of using a common MAC entity, the physical layer provides the grant-specific information as well as the intended numerology layer to the common MAC entity, such that the common MAC entity can use this information during the LCP procedure.

The UE thus can generate a transport block, and then transmit same according to the received uplink scheduling assignment.

A resource allocation procedure as presented above according to the various embodiment and variants which allows the eNodeB to efficiently schedule uplink transmissions for an UE which is configured with one or more different numerology layers.

Instead of being associated with a numerology layer, a logical channel/radio bearer could be associated with a TTI length, i.e. a mapping is provided in the UE between logical channels and TTI lengths. Then, the uplink grant would indicate the TTI length, and subsequently the LCP procedure would be performed according to the indicated TTI length, e.g. logical channels which are associated with the indicated TTI are prioritized (or even exclusively served) during the LCP procedure.

As a further alternative to the above-described numerology-specific LCP procedure, a variant of the embodiment foresees that one LCP procedure is provided for each usage scenario, i.e. one LCP procedure is performed for eMBB, another one for URRL and another one for mMTC, etc. This could be implemented in the UE e.g. by providing a separate MAC entity for each usage scenario of the UE or by providing a common MAC entity. In case of using separate MAC entities, there would be also a mapping between logical channels and usage scenarios respectively the corresponding MAC entities.

Figure 14:
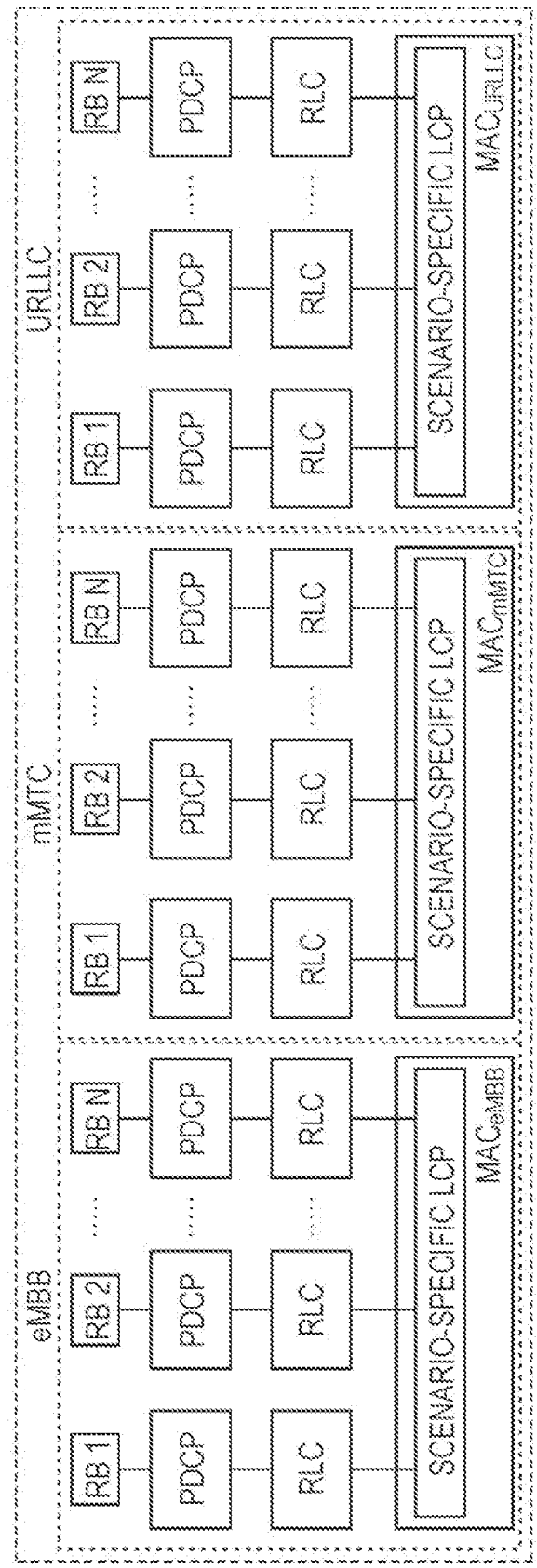
FIG. 14 illustrates the layer structure of the UE according to one exemplary embodiment where usage-scenario-specific LCP procedures as well as MAC entities are provided.

In said case, when performing the LCP procedure, it should be clear which logical channels are associated with which usage scenario such that the UE can distinguish and appropriately prioritize the logical channels during the LCP procedure. The uplink scheduling assignment transmitted by the eNB can still be numerology specific, such that logical channels that belong to the numerology layer indicated by the received uplink scheduling assignment are prioritized over other logical channels. Furthermore, since the LCP procedure is usage scenario specific, only those logical channels belonging to that usage scenario shall be considered for and prioritized during the usage-scenario-specific LCP procedure. FIG. 14 illustrates an exemplary layer structure of the UE with separate usage scenario specific MAC entities and corresponding separate LCP procedures.

As mentioned before, different scheduling modes are possible for the UE and the logical channels. In said respect, logical channels can be scheduled based on one or more scheduling modes. In a further improved variant of the embodiments, the LCP procedure(s) should also take into account the scheduling modes of the logical channels. Put generally, radio resources allocated by an uplink scheduling assignment received from the eNodeB, should be preferably used for transmitting data from logical channels that are associated with the eNodeB-controlled scheduling mode. Therefore, during the LCP procedure, the logical channels shall be prioritized not only according to their associated numerology scheme, but shall also be prioritized according to whether or not they are associated to the eNodeB-controlled scheduling mode. For instance, radio resources allocated by an uplink scheduling assignment received from the eNodeB should not be used for transmitting data from logical channels that are only associated with the grant-free scheduling mode, or should only be allocated in case radio resources remain after the assigned radio resources have been allocated to data from logical channels that are associated with the eNodeB-controlled scheduling mode.

In order to assist the scheduling function (e.g. in the eNodeB) and to allow for efficient uplink scheduling, the buffer status reporting procedure can be adapted to the new radio access technology of 5G and possibly also to the improved radio resource allocation procedure as discussed above. In general, the scheduling control function in the eNodeB should be provided by the UE with appropriate information to generate numerology-layer-specific uplink scheduling assignments. Therefore, the buffer status reporting procedure performed by the UE should be reporting the buffer status per numerology layer to the eNB, such that the eNB can determine the amount of data available for transmission in the UE for each numerology layer. This can be achieved as follows.

According to one option, a common buffer status reporting procedure is performed in the UE for all numerology layers, according to which for each numerology layer configured in the UE, a buffer status is separately determined across logical channels associated to the respective numerology layer. The buffer status reporting procedure then generates a corresponding report comprising information on the buffer status of all the configured numerology layers, the generated report being then transmitted to the eNodeB. According to one exemplary implementation, a new BSR MAC control element could be defined to carry the buffer status information for each configured numerology scheme.

Figure 15:
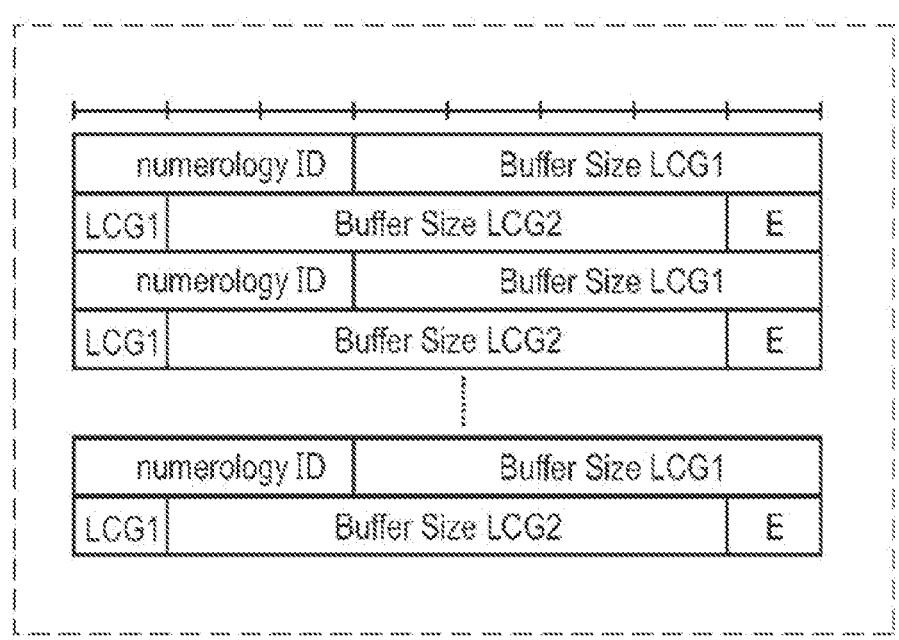
FIG. 15 illustrates a numerology-specific buffer status reporting MAC control element according to one exemplary embodiment.

FIG. 15 shows an exemplary BSR MAC control element where the three bits are assumed to be used for indicating the numerology scheme followed by respectively 6 bits for the buffer size for each of the two exemplarily assumed two logical channel groups. An extension bit is provided in order to indicate whether a further buffer status is reported for another numerology scheme.

In such a buffer status reporting procedure, in a scenario where a data of a service can be transmitted using different numerology schemes, the UE can suggest respectively decide on how to divide the pending data of one service among the respective numerology schemes.

According to another option, separate buffer status reporting procedures can be foreseen for the numerology layers configured for the UE, such that the UE performs the buffer status reporting separately for each configured numerology layer. Consequently, a buffer status is determined across logical channels associated to one numerology layer, and information thereon is included in a corresponding buffer status report. According to one implementation, a new BSR MAC CE could be defined to carry the buffer status information for one configured numerology scheme. Alternatively, the BSR MAC CE as already known from the currently standardized LTE/LTE-A systems could be used in said respect.

Moreover, the buffer status reporting procedure can be implemented in the UE either with one MAC entity or separate MAC entities. For example, a common MAC entity could be responsible for performing either a common buffer status reporting procedure or the various separate numerology specific buffer status reporting procedures. On the other hand, one MAC entity can be provided per numerology layer (an option already discussed above in connection with the LCP procedure) such that the BSR procedure is already specific to only the respective numerology layer.

In the above discussed implementations, it is exemplarily assumed that the BSR procedure will be part of the MAC entity of a UE, as is the case in current LTE(-A) UEs. However, no agreements have been made yet for 5G in said respect. Correspondingly, it might be decided that the BSR procedure resides in another entity (e.g. the RLC entity), in which case the above discussion shall apply with respect to this other entity.

According to further variants of the improved BSR procedure, separate BSR configurations can be defined per numerology layer. In particular, as explained in the background section, the BSR procedure is triggered by certain events. Some or all of the BSR triggers respectively the BSR-related timers can also be made numerology layer specific. For instance, for services mapped to a specific numerology layer it might be beneficial to report the buffer status periodically, i.e. for eMBB services, whereas for other services that are using a different numerology it might not be very useful, e.g. mMTC services mapped to a certain numerology layer. As a further example, a padding BSR might not be used for all numerology layers. Essentially, the BSR configurations, i.e. timer settings, or other BSR trigger might be different for different numerologies.

In other exemplary embodiments, even though the BSR configurations/triggers may be numerology-layer-specific, the reporting of the buffer status will be always for all numerology layers. More in particular, upon a BSR is triggered for any of the numerology layers, the UE will report the complete buffer status of the UE, i.e. UE reports for all numerology layers the corresponding buffer status.

As explained in the background section, buffer status reporting according to LTE(-A) is based on a group concept where several logical channels can be grouped together (e.g. based on having same/similar QoS requirements) when determining the buffer status. In a similar manner, the logical channels for each numerology layer can be appropriately grouped together in different logical channel groups to implement a finer granularity than provided by a BSR reporting per numerology layer.

As a further alternative, instead of providing a buffer status reporting procedure to report the buffer status per numerology layer, other embodiments provide a BSR procedure to report the buffer status per usage scenario, such that the eNB can determine the amount of data available for transmission in the UE per usage scenario of the UE. For instance, services of the eMBB type (as discussed above with the TCP) can benefit from having separate numerology schemes (lower frequency band vs. higher frequency band), in which case it is enough for the eNodeB to learn the amount of data available in the UE for the eMBB usage scenario rather than the numerology schemes of the eMBB service. The eNodeB can then decide on how to allocate resources to either of the numerology schemes for the eMBB scenario, and thus issues corresponding numerology-specific uplink scheduling assignments as discussed before.

FIG. 16 discloses such an exemplary BSR MAC control element, based on the currently-standardized, long BSR MAC CE, where three octets are available per usage scenario for reporting the buffer status of four different LCGs. Compared to the buffer status reporting, as explained in connection with FIG. 15, the UE simply reports the data per usage scenario, such that the buffer status reporting does not vary for scenarios where a particular service is associated with several numerology schemes.

Another improvement for the radio resource allocation procedure focuses on the scheduling request transmitted by a UE in order to request uplink radio resources from the eNodeB. The scheduling request can be specific to a numerology scheme or to a usage scenario, e.g. by simply indicating the numerology scheme/usage scenario for which the uplink radio resources are being requested. For instance, a new field in the scheduling request could be foreseen to indicate the numerology scheme or usage scenario. The eNB when receiving the scheduling request can decide how much radio resources to allocate to a specific numerology scheme as discussed above. Alternatively, in order for the eNodeB to learn the intended numerology layer or usage scenario, the UE could be configured with different channels where the scheduling request is being transmitted, i.e. one SR channel configuration for each numerology layer respectively usage scenario.

According to further embodiments, the DRX functionality can be adapted to the new radio access technology of 5G. Particularly, the DRX configuration can be made numerology specific or usage scenario specific. In more detail, the DRX procedure is currently defined on a subframe basis, as discussed in detail in the background section. Taking into account that the different numerology schemes may differ with regard to their subframe time period, the common DRX scheme as currently used in the standardized LTE(-A) systems seems not appropriate. Separate DRX procedures can be provided for different numerology schemes. Also, when seeing it from the service point of view, the different usage scenarios have very different traffic models/characteristics. Therefore, separate DRX configurations are, according to one exemplary embodiment, used for different usage scenarios. In case one usage scenario (e.g. eMBB) is using multiple numerology layers, there may be some common DRX scheme/configuration across these multiple numerology layers, i.e. Active Time is the same for these multiple numerology layers. On the other hand, when having separate DRX configurations/schemes for usage scenario respectively numerology layers, it would basically mean that the UE could have a different DRX state for each usage scenario/numerology layer. Essentially, UE could be in DRX, i.e. power saving state, for one numerology layer, i.e. not being required to monitor for control channels, whereas the UE is in ActiveTime for another usage scenario/numerology layer, i.e. UE is monitoring for control channels. More in particular, a DCI/control channel, e.g. uplink or downlink grant, received for a specific numerology layer/usage scenario will trigger the starting of the DRX related timers, i.e. for instance DRX-Inactivity timer, of the DRX procedure associated to this numerology layer/usage scenario. For example, when the eNB grants uplink resources for an eMBB service, then the UE shall start, upon reception of this DCI, the inactivity timer of the eMMB-linked DRX procedure.

According to further embodiments, the timing advance procedure can be adapted to the new radio access technology of 5G. Particularly, the timing advance procedure can be made numerology scheme specific, for instance by providing timing advance timer values that are different for different numerology schemes. Since one of the characteristics/L1 parameter of a numerology layer is the cyclic prefix (CP) length, the maintenance of the timing alignment for uplink synchronization is numerology layer-specific according to one exemplary embodiment. The uplink transmission timing should be set with an accuracy well within the length of the uplink CP length. Since CP lengths are different for different numerologies as mentioned before, there might be a need to have a finer granularity of the uplink timing alignment for certain numerologies, i.e. the ones having a small CP length. According to one exemplary embodiment, the different numerologies will be grouped for the maintenance of uplink timing/synchronization, i.e. numerology layers/scheme having similar channel characteristics, e.g. CP length, will have one common Timing Advance timer.

FURTHER EMBODIMENTS

According to a first aspect, a user equipment in a mobile communication system is provided, the user equipment being configured with at least one numerology scheme, each of which is associated with parameters that partition a plurality of time-frequency radio resources of the mobile communication system into resource scheduling units in a different manner. The user equipment is configured with a plurality of logical channels each of which is associated with at least one of the configured numerology schemes. A receiver of the user equipment receives an uplink scheduling assignment from a radio base station that controls the user equipment, the uplink scheduling assignment indicating uplink radio resources usable by the user equipment. A processor of the user equipment determines for which numerology scheme the received uplink scheduling assignment is intended based on the received uplink scheduling assignment. The processor performs a logical channel prioritization procedure by allocating the assigned uplink radio resources to the configured logical channels and by prioritizing those of the configured logical channels that are associated with the numerology scheme for which the uplink scheduling assignment is intended.

According to a second aspect which is provided in addition to the first aspect, the receiver receives information on a plurality of numerology schemes supported by the radio base station. Optionally, the information on the plurality of numerology schemes is received in a system information block broadcast by the radio base station. As a further option the information on the plurality of numerology schemes comprises a numerology layer indication for each numerology scheme.

According to a third aspect which is provided in addition to one of the first to second aspects, the processor determines for which numerology scheme the received uplink scheduling assignment is intended from:
 a numerology layer indication within the received uplink scheduling assignment, or
 a user equipment identity used by the radio base station for encoding the uplink scheduling assignment, or
 time-frequency resources used by the radio base station for transmitting the uplink scheduling assignment.

According to a fourth aspect in addition to one of the first to third aspects, a different Medium Access Control, MAC, entity in the user equipment is configured for and associated to each numerology scheme configured for the user equipment. Each of the MAC entities in the user equipment is responsible for the logical channel prioritization procedure according to the associated numerology scheme. Alternatively, a different Medium Access Control, MAC, entity in the user equipment is configured for and associated to each data transmission usage scenario of the user equipment. Each of the MAC entities in the user equipment is responsible for the logical channel prioritization procedure according to the associated data transmission usage scenario. Optionally each data transmission usage scenario encompasses at least one numerology scheme. Optionally, the data transmission usage scenario is one of massive machine-type communication, mMTC, enhanced mobile broadband, eMBB, and ultra-reliable low-latency communications, URLLC.

According to a fifth aspect in addition to one of the first to fourth aspects, each of the logical channels is configured with a resource allocation mode. The resource allocation mode is for either a radio base station controlled resource allocation mode and/or a fast resource allocation mode. The processor performs the logical channel prioritization procedure by allocating the assigned radio resources to the configured logical channels and by prioritizing those of the configured logical channels that are associated with the radio base station controlled resource allocation mode. Optionally, the fast radio resource allocation mode is performed by the user equipment autonomously without requesting and receiving an uplink scheduling assignment from the radio base station.

According to a sixth aspect in addition to one of the first to fifth aspects, the processor performs a common buffer status reporting procedure for all numerology schemes configured for the user equipment. The processor, when performing the common buffer status reporting procedure, generates a common buffer status report that separately indicates a buffer status of the logical channels being associated with each numerology scheme configured for the user equipment. A transmitter of the user equipment transmits the generated common buffer status report to the radio base station. Optionally, a separate buffer status reporting configurations and/or triggers for the common buffer status reporting procedure are defined for each numerology scheme configured for the user equipment.

According to the seventh aspect in addition to one of the first to fifth aspects, the processor performs a separate buffer status reporting procedure for each of the numerology schemes configured for the user equipment. The processor, when performing the separate buffer status reporting procedure for one of the numerology schemes, generates a buffer status report that indicates a buffer status of the logical channels being associated with that one numerology scheme. A transmitter of the user equipment transmits the generated separate buffer status reports to the radio base station.

According to eighth aspect in addition to one of the first to fifth aspects, the processor performs a common buffer status reporting procedure for all data transmission usage scenarios of the user equipment. The processor, when performing the common buffer status reporting procedure, generates a common buffer status report that separately indicates a buffer status of the logical channels being associated with each data transmission usage scenario. A transmitter of the user equipment transmits the generated common buffer status report to the radio base station. Optionally, each data transmission usage scenario encompasses at least one numerology scheme. Optionally, the data transmission usage scenario is one of massive machine-type communication, mMTC, enhanced mobile broadband, eMBB, and ultra-reliable low-latency communications, URLLC.

According to ninth aspect in addition to one of the first to eighth aspects, the processor, when performing the logical channel prioritization procedure, prioritizes the logical channels such that radio resources are allocated to only those logical channels that are associated with the numerology scheme for which the received uplink scheduling assignment is intended.

According to tenth aspect in addition to one of the first to ninth aspects, the processor generates a scheduling request for requesting uplink radio resources from the radio base station. The scheduling request indicates the numerology scheme or the data transmission usage scenario for which the uplink radio resources are requested.

According to eleventh aspect, a radio base station is provided for performing a radio resource allocation procedure for a user equipment in a mobile communication system. The user equipment is configured with at least one numerology scheme, each of which is associated with parameters that partition a plurality of time-frequency radio resources of the mobile communication system into resource scheduling units in a different manner. The user equipment is configured with a plurality of logical channels each of which is associated with at least one of the configured numerology schemes. A processor of the radio base station generates an uplink scheduling assignment indicating uplink radio resources usable by the user equipment. The uplink scheduling assignment is generated such that the user equipment, upon receiving the uplink scheduling assignment, can determine for which numerology scheme the uplink scheduling assignment is intended based on the uplink scheduling assignment received by the user equipment. A transmitter of the radio base station transmits the generated uplink scheduling assignment to the user equipment.

According to a twelfth aspect in addition to the eleventh aspect, the transmitter transmits information on a plurality of numerology schemes supported by the radio base station. Optionally, the information on the plurality of numerology schemes is broadcast in a system information block. Optionally, the information on the plurality of numerology schemes comprises a numerology layer indication for each numerology scheme.

According to a thirteenth aspect provided in addition to the eleventh or twelfth aspect, the processor, when generating the uplink scheduling assignment:
  includes a numerology layer indication within the uplink scheduling assignment, or
  encodes the uplink scheduling assignment using a user equipment identity specific to the intended numerology scheme, or the generated uplink scheduling assignment is transmitted by the transmitter in time-frequency resources specific to the intended numerology scheme.

According to a fourteenth aspect provided in addition to one of the eleventh to thirteenth aspects, a receiver of the radio base station receives a common buffer status report that separately indicates a buffer status of the logical channels being associated with each numerology scheme configured for the user equipment, or receives separate buffer status reports, each of which indicates a buffer status of the logical channels being associated with one numerology scheme, or receives a common buffer status report that separately indicates a buffer status of the logical channels being associated with each data transmission usage scenario. Optionally, each data transmission usage scenario encompasses at least one numerology scheme, optionally wherein the data transmission usage scenario is one of massive machine-type communication, mMTC, enhanced mobile broadband, eMBB, and ultra-reliable low-latency communications, URLLC.

According to a fifteenth aspect provided in addition to one of the eleventh to fourteenth aspects, a receiver of the radio base station receives a scheduling request from the user equipment requesting uplink radio resources, wherein the scheduling request indicates the numerology scheme or the data transmission usage scenario for which the uplink radio resources are requested.

According to a sixteenth aspect, a method for a user equipment in a mobile communication system is provided. The user equipment is configured with at least one numerology scheme, each of which is associated with parameters that partition a plurality of time-frequency radio resources of the mobile communication system into resource scheduling units in a different manner. The user equipment is configured with a plurality of logical channels each of which is associated with at least one of the configured numerology schemes. The method comprises the following steps performed by the user equipment. An uplink scheduling assignment is received from a radio base station that controls the user equipment, the uplink scheduling assignment indicating uplink radio resources usable by the user equipment. The user equipment determines for which numerology scheme the received uplink scheduling assignment is intended based on the received uplink scheduling assignment. A logical channel prioritization procedure is performed by the user equipment by allocating the assigned uplink radio resources to the configured logical channels and by prioritizing those of the configured logical channels that are associated with the numerology scheme for which the uplink scheduling assignment is intended.

According to a seventeenth aspect provided in addition to the sixteenth aspect, the method further comprises the step of receiving information on a plurality of numerology schemes supported by the radio base station. Optionally, the information on the plurality of numerology schemes is received in a system information block broadcast by the radio base station. Optionally, the information on the plurality of numerology schemes comprises a numerology layer indication for each numerology scheme.

According to an eighteenth aspect provided in addition to the sixteenth or seventeenth aspect, the step of determining determines for which numerology scheme the received uplink scheduling assignment is intended from:
  a numerology layer indication within the received uplink scheduling assignment, or
  a user equipment identity used by the radio base station for encoding the uplink scheduling assignment, or
  time-frequency resources used by the radio base station for transmitting the uplink scheduling assignment.

According to a nineteenth aspect provided in addition to one of the sixteenth to eighteenth aspects, each of the logical channels is configured with a resource allocation mode. The resource allocation mode is a radio base station controlled resource allocation mode and/or a fast resource allocation mode. The step of performing the logical channel prioritization procedure further includes prioritizing those of the configured logical channels that are associated with the radio base station controlled resource allocation mode. Optionally, the fast radio resource allocation mode is performed by the user equipment autonomously without requesting and receiving an uplink scheduling assignment from the radio base station.

According to a twentieth aspect provided in addition to one of the sixteenth to eighteenth aspects, the method further comprises the step of performing a common buffer status reporting procedure for all numerology schemes configured for the user equipment. The step of performing the common buffer status reporting procedure includes generating a common buffer status report that separately indicates a buffer status of the logical channels being associated with each numerology scheme configured for the user equipment and transmitting the generated common buffer status report to the radio base station. Optionally, separate buffer status reporting configurations and/or triggers for the common buffer status reporting procedure are defined for each numerology scheme configured for the user equipment.

According to a 21'st aspect provided in addition to one of the sixteenth to eighteenth aspects, the method further comprises the step of performing a separate buffer status reporting procedure for each of the numerology schemes configured for the user equipment. The step of performing the separate buffer status reporting procedure for one of the numerology schemes includes generating a buffer status report that indicates a buffer status of the logical channels being associated with that one numerology scheme, and transmitting the generated separate buffer status reports to the radio base station.

According to a 22'nd aspect provided in addition to one of the sixteenth to eighteenth aspects, the method further comprises the step of performing a common buffer status reporting procedure for all data transmission usage scenarios of the user equipment. The step of performing the common buffer status reporting procedure, includes generating a common buffer status report that separately indicates a buffer status of the logical channels being associated with each data transmission usage scenario and transmitting the generated common buffer status report to the radio base station. Optionally, each data transmission usage scenario encompasses at least one numerology scheme, optionally wherein the data transmission usage scenario is one of massive machine-type communication, mMTC, enhanced mobile broadband, eMBB, and ultra-reliable low-latency communications, URLLC.

According to a 23'rd aspect provided in addition to one of the sixteenth to 22'nd aspects, the step of prioritizing the logical channels is such that radio resources are allocated to only those logical channels that are associated with the numerology scheme for which the received uplink scheduling assignment is intended.

According to a 24'th aspect provided in addition to one of the sixteenth to 23'rd aspects, the method further comprises the steps of generating a scheduling request for requesting uplink radio resources from the radio base station and transmitting the generated scheduling request to the radio base station. The scheduling request indicates the numerology scheme or the data transmission usage scenario for which the uplink radio resources are requested.

In one general first aspect, the techniques disclosed here feature a radio base station for performing a radio resource allocation procedure for a user equipment in a mobile communication system. The user equipment is configured with at least one numerology scheme, each of which is associated with parameters that partition a plurality of time-frequency radio resources of the mobile communication system into resource scheduling units in a different manner. The user equipment is configured with a plurality of logical channels each of which is associated with at least one of the configured numerology schemes. A processor of the radio base station generates an uplink scheduling assignment indicating uplink radio resources usable by the user equipment, wherein the uplink scheduling assignment is generated such that the user equipment, upon receiving the uplink scheduling assignment, can determine for which numerology scheme the uplink scheduling assignment is intended based on the uplink scheduling assignment received by the user equipment. A transmitter of the radio base station transmits the generated uplink scheduling assignment to the user equipment.

In one general first aspect, the techniques disclosed here feature a method for a user equipment in a mobile communication system. The user equipment is configured with at least one numerology scheme, each of which is associated with parameters that partition a plurality of time-frequency radio resources of the mobile communication system into resource scheduling units in a different manner. The user equipment is configured with a plurality of logical channels each of which is associated with at least one of the configured numerology schemes. The method comprises the following steps performed by the user equipment:

receiving an uplink scheduling assignment from a radio base station that controls the user equipment, the uplink scheduling assignment indicating uplink radio resources usable by the user equipment, determining for which numerology scheme the received uplink scheduling assignment is intended based on the received uplink scheduling assignment, and performing a logical channel prioritization procedure by allocating the assigned uplink radio resources to the configured logical channels and by prioritizing those of the configured logical channels that are associated with the numerology scheme for which the uplink scheduling assignment is intended.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

What is claimed is:

1. An integrated circuit for a radio base station, the integrated circuit comprising:

processing circuitry, which, in operation, generates an uplink scheduling assignment indicating uplink radio resources usable by a user equipment;

wherein the user equipment is configured with at least one numerology scheme, each of which is associated with parameters that partition time-frequency radio resources into resource scheduling units in a different manner, and wherein the user equipment is configured with logical channels each of which is associated with at least one of the configured numerology scheme(s);

transmitting circuitry, which, in operation, transmits the uplink scheduling assignment to the user equipment;

wherein the user equipment, based on the uplink scheduling assignment, determines a numerology scheme out of the configured numerology scheme(s), and performs a logical channel prioritization procedure by allocating the assigned uplink radio resources to the configured logical channels and by prioritizing those of the configured logical channels that are associated with the determined numerology scheme; and receiving circuitry, which, in operation, receives a common buffer status report from the user equipment, wherein the common buffer status report separately indicates a buffer status of each logical channel group (LCG), wherein the logical channels associated with each of the configured numerology scheme(s) are grouped into one or more LCGs.

2. The integrated circuit according to claim 1, wherein the transmitting circuitry, when in operation, transmits information on a plurality of numerology schemes supported by the radio base station, wherein the information on the plurality of numerology schemes is transmitted in a system information block broadcast by the radio base station, wherein the information on the plurality of numerology schemes comprises a numerology layer indication for each numerology scheme.

3. The integrated circuit according to claim 1, wherein the user equipment determines the numerology scheme based on the uplink scheduling assignment from at least one of:
   a numerology layer indication within the uplink scheduling assignment;
   a user equipment identity used by the radio base station for encoding the uplink scheduling assignment; or
   time-frequency resources used by the radio base station for transmitting the uplink scheduling assignment.

4. The integrated circuit according to claim 1,
   wherein a different Medium Access Control (MAC) entity in the user equipment is configured for and associated with each numerology scheme configured for the user equipment, wherein each of the MAC entities in the user equipment is responsible for the logical channel prioritization procedure according to the associated numerology scheme; or
   wherein a different Medium Access Control (MAC) entity in the user equipment is configured for and associated with each data transmission usage scenario of the user equipment, wherein each of the MAC entities in the user equipment is responsible for the logical channel prioritization procedure according to the associated data transmission usage scenario, wherein each data transmission usage scenario encompasses at least one numerology scheme, wherein the data transmission usage scenario is one of massive machine-type communication (mMTC), enhanced mobile broadband (eMBB), or ultra-reliable low-latency communications (URLLC).

5. The integrated circuit according to claim 1,
   wherein each of the logical channels of the user equipment is configured with a resource allocation mode, wherein the resource allocation mode is a radio base station controlled resource allocation mode and/or a fast resource allocation mode;
   wherein the user equipment, when in operation, performs the logical channel prioritization procedure by allocating the assigned uplink radio resources to the configured logical channels and by prioritizing those of the configured logical channels that are associated with the radio base station controlled resource allocation mode; and
   wherein the fast radio resource allocation mode is performed by the user equipment autonomously without requesting and receiving the uplink scheduling assignment from the radio base station.

6. The integrated circuit according to claim 1, wherein separate buffer status reporting configurations and/or triggers for the common buffer status reporting procedure are defined for each numerology scheme configured for the user equipment.

7. The integrated circuit according to claim 1,
   wherein the user equipment performs a separate buffer status reporting procedure for each of the numerology schemes configured for the user equipment;
   wherein the user equipment, when performing the separate buffer status reporting procedure for one of the numerology schemes, generates a buffer status report that indicates a buffer status of the logical channels associated with that one numerology scheme; and
   wherein the receiving circuitry, when in operation, receives the separate buffer status reports from the user equipment.

8. The integrated circuit according to claim 1,
   wherein the user equipment performs the common buffer status reporting procedure for all data transmission usage scenarios of the user equipment;
   wherein the user equipment, when performing the common buffer status reporting procedure, generates a second common buffer status report that separately indicates a buffer status of the logical channels associated with each data transmission usage scenario;
   wherein the receiving circuitry, when in operation, receives the second common buffer status report from the user equipment; and
   wherein each data transmission usage scenario encompasses at least one numerology scheme, wherein each data transmission usage scenario is one of massive machine-type communication (mMTC), enhanced mobile broadband (eMBB), or ultra-reliable low-latency communications (URLLC).

9. The integrated circuit according to claim 1, wherein the user equipment, when performing the logical channel prioritization procedure, prioritizes the logical channels such that radio resources are allocated to only those logical channels that are associated with the numerology scheme for which the uplink scheduling assignment is intended.

10. The integrated circuit according to claim 1, wherein the user equipment, when in operation, generates a scheduling request for requesting uplink radio resources from the radio base station, wherein the scheduling request indicates a numerology scheme or a data transmission usage scenario for which the uplink radio resources are requested.

* * * * *